US011119762B1

(12) United States Patent
Bush et al.

(10) Patent No.: US 11,119,762 B1
(45) Date of Patent: Sep. 14, 2021

(54) REUSABLE ANALYTICS FOR PROVIDING CUSTOM INSIGHTS

(71) Applicant: CERNER INNOVATION, INC., Kansas City, KS (US)

(72) Inventors: Aaron Matthew Bush, Draper, UT (US); Jeffrey Andrew Townsend, Smithville, MO (US); Daniel Lee Martin, Lee's Summit, MO (US)

(73) Assignee: CERNER INNOVATION, INC., Kansas City, KS (US)

( * ) Notice: Subject to any disclaimer, the term of this patent is extended or adjusted under 35 U.S.C. 154(b) by 4 days.

(21) Appl. No.: 16/050,609

(22) Filed: Jul. 31, 2018

(51) Int. Cl.
*G06F 8/75* (2018.01)
*G06F 11/36* (2006.01)
*G06F 8/77* (2018.01)

(52) U.S. Cl.
CPC .............. *G06F 8/75* (2013.01); *G06F 8/77* (2013.01); *G06F 11/3608* (2013.01); *G06F 11/3612* (2013.01)

(58) Field of Classification Search
CPC .... G06F 11/3608; G06F 11/3612; G06F 8/34; G06F 8/35; G06F 8/41; G06F 8/65; G06F 8/75; G06F 8/77
See application file for complete search history.

(56) References Cited

U.S. PATENT DOCUMENTS

| | | | | |
|---|---|---|---|---|
| 8,856,156 B1 * | 10/2014 | McNair | ................. | G06N 5/02 707/756 |
| 10,228,915 B2 * | 3/2019 | Kambach | ................. | G06F 9/453 |
| 2007/0129983 A1 * | 6/2007 | Scherpbier | ............. | G16H 10/65 705/2 |
| 2012/0174018 A1 * | 7/2012 | Ash | ........................ | G06F 3/0481 715/772 |
| 2013/0275164 A1 * | 10/2013 | Gruber | ................... | G06Q 10/02 705/5 |
| 2014/0337266 A1 * | 11/2014 | Kains | ....................... | G06N 5/02 706/46 |
| 2014/0337814 A1 * | 11/2014 | Kains | ....................... | G06F 8/00 717/100 |
| 2015/0324535 A1 * | 11/2015 | Ash | ....................... | G06F 3/0481 705/3 |
| 2017/0177715 A1 * | 6/2017 | Chang | ................ | G06F 17/2785 |
| 2017/0286456 A1 * | 10/2017 | Wenzel | ................ | G06F 16/212 |

* cited by examiner

*Primary Examiner* — Marina Lee
(74) *Attorney, Agent, or Firm* — Shook, Hardy & Bacon L.L.P.

(57) ABSTRACT

Methods, computer systems, and computer storage media are provided for enabling the reuse of data structures, data processing, data cleaning, data mapping, analytic concepts, analytic widgets, logic, and graphical components to efficiently provide custom insights to new areas. Additionally, the reuse of data structures, data processing, data cleaning, data mapping, analytic concepts, analytic widgets, logic, and graphical components created for a single model can also be reused components across new models, which enables new models to be efficiently created for a completely separate set of analytics. A model is inimitably created by creating, cleaning, and/or mapping a data concept and creating widgets that provide analytic capabilities for the model. These data concepts and widgets are specifically designed to be reused across models and model instances for a plurality of clients or users. Any data concepts and widgets of the model can also be modified to provide a customized solution.

20 Claims, 32 Drawing Sheets

Summary Cloud (Total Volume: 6,958) [Show Change] [Multiselect Phrases ▾] [⚙]

Word Cloud Display Options [×]

— Display Options —

Word Cloud Type: [Two Word Combination ⇕]
Display by: [Total Volume ⇕]
Min Word Frequency Count to Display: [2]
Max Angles in degrees (+/-): [60]
Max Number of Angles: [10]
Max Font Size: [48]
Padding Size Between Words: [3]
Analysis Style:
  ◉ Normal Analysis
  ○ Reduce Variances
  ○ Amplify Variances
Highlight Daily Change: [All ⇕]

1510

— Time Frame Change Display Options —

Compare Time Frames: [Weekly ⇕]
Start Date to Compare Against: [04/25/2017]
Secondary Compare Date (Optional): [ ]
Volume Change to Flag: [1]  % of Total (3)
% Volume Change to Flag: [25]  % Change

[Apply]

FIG. 15

| | |
|---|---|
| | Filter: [Enter keywords]  ✓ Check all  ✗ Uncheck all  ⊗ |
| | ☑ Compare |
| 2710 | ☑ ABC Medical Group - 1,874,334 |
| 2720 | ☑ DEF Regional Hospital - 363,928 |
| 2730 | ☑ GHI Hospital Center - 361,266 |
| 2740 | ☑ JKL Hospital - 167,985 |
| 2750 | ☑ MNO Regional Medical Center - 116,470 |
| | ☐ PQR Regional Hospital - 97,586 |
| | ☐ STU Hospital - 91,794 |

FIG. 27

▽ Unbilled Claim Amount

ⓘ Unbilled Claim Amount: (Values: $0 to $2,056,132)

2810 — Unbilled Claim Amount: Between [ ] and [ ]  ☑

FIG. 28

| ▽ Detail Data (Top 100 Records - Based on Last Start Date) | | | | | | | | 3310 |
|---|---|---|---|---|---|---|---|---|
| Show 15 ⇕ entries | | | | | | | | |
| | | | | | Team | | | |
| Universal ID ⇕ | Client Site ⇕ | Status ⇕ | Team | ⇕ | Client VIP | ⇕ Priority ⇕ | Analysis Type ⇕ | Cur Sys |
| ⊕ 123456789 | --- | Assigned | | | MS_Pharmacy_ABC | | No | Low |
| ⊕ 123456789 | ABC | Assigned | | | MS_Pharmacy_ABC | | No | Low |
| ⊕ 123456789 | ABC | Assigned | | | MS_Pharmacy_ABC | | No | Low |

FIG. 33

| Billing Org | Region | Billing Entity Name | Facility | Enc Class | Medical Service | Primary Financial Class | Primary Health Plan |
|---|---|---|---|---|---|---|---|
| ⊕ Medical Group | North Region 1 | XYZ Medical Group | ABC_Pediatrics | Outpatient | - | Medicaid | Medicaid Utah Traditional |
| ⊕ Medical Group | North Region 1 | XYZ Medical Group | ABC_Pediatrics | Outpatient | - | Medicaid | Medicaid Utah Traditional |

| ⊖ Medical Group | North Region 1 | XYZ Medical Group | ABC_Pediatrics | Outpatient | - | Medicaid | Medicaid Utah Traditional | Medicaid |
|---|---|---|---|---|---|---|---|---|

| Hold Status | Hold Reason | Hold Reason Start Date | Hold Reason End Date | Days in Hold Reason |
|---|---|---|---|---|
| StdDly | Standard Delay | 2015-04-22 12:00:00 AM | 2015-05-13 12:00:00 AM | 22 |
| ReadyBill | Ready to Bill | 2015-05-14 12:00:00 AM | 2015-05-14 12:00:00 AM | 1 |
| CorrReq | Correction Required | 2015-05-15 12:00:00 AM | 2015-05-18 12:00:00 AM | 1 |
| Scrubber | Held in Scrubber-Submitted not transmitted | 2015-05-19 12:00:00 AM | 2017-03-23 12:00:00 AM | 675 |

| | | | | Export Detail Data | 100 | | |
|---|---|---|---|---|---|---|---|
| Search: | | Filter by Universal ID(s): | 123456789 | | | | Apply |

| Description | Resolution | First Ticket Date | Last Ticket Date | Number of Days in Ticket | Ticke State |
|---|---|---|---|---|---|
| Lorem ipsum dolor sit amet, consectetur adipiscing elit. In vulputate egestas neque, ut iaculis magna pellentesque vitae. Aliquam erat volutpat. Maecenas laoreet sapien vel nulla sollicitudin tincidunt. Maecenas vitae ultrices velit. Curabitur nisl nulla, sodales ut enim quis, ultricies semper odio. Maecenas facilisis arcu at risus luctus, et faucibus turpis elementum. Aenean malesuada in ante in gravida. Proin a erat scelerisque, tincidunt augue sed, posuere felis. Vivamus ac molestie velit. In risus felis, semper ac posuere in, aliquet vitae odio. | Aliquam pharetra hendrerit varius. Sed nec ligula nibh. Cras maximus lobortis tempus. | 2017-04-01 05:34:07 PM | 2017-04-01 05:36:33 PM | 1 | Reso |

REUSABLE ANALYTICS FOR PROVIDING CUSTOM INSIGHTS

BACKGROUND

Currently, business intelligence tools enable users to reuse graphical components. For example, if a user has a line chart that displays some activity over time, the user can reuse that line chart to display a different activity over time. The ability to reuse that graphical component (i.e., the line chart) makes additional analysis in any area where the user wishes to trend data possible. However, to reuse the line graph in this example, a custom data set must be created and the analysis must be customized. Such customizations require a great deal of time and resources.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to enabling the reuse of data structures, data processing, analytic concepts, and graphical components (i.e., models) to efficiently provide custom insights to new areas (i.e., model instances). Initially, a model is created by creating, cleaning, and/or mapping a data concept and creating widgets that provide analytic capabilities for the model. These data concepts and widgets are specifically designed to be reused across models, model instances, or clients. Any data concepts and widgets of the model can also be modified to provide a customized solution (i.e., model instances). Customizations of the model instances can be reused to efficiently provide additional insights to existing models.

BRIEF DESCRIPTION OF THE SEVERAL VIEWS OF THE DRAWINGS

The present invention is described in detail below with reference to the attached drawing figures, wherein:

FIGS. 3-38 depict illustrative screen displays, in accordance with embodiments of the present invention;

DETAILED DESCRIPTION

Figure 1:
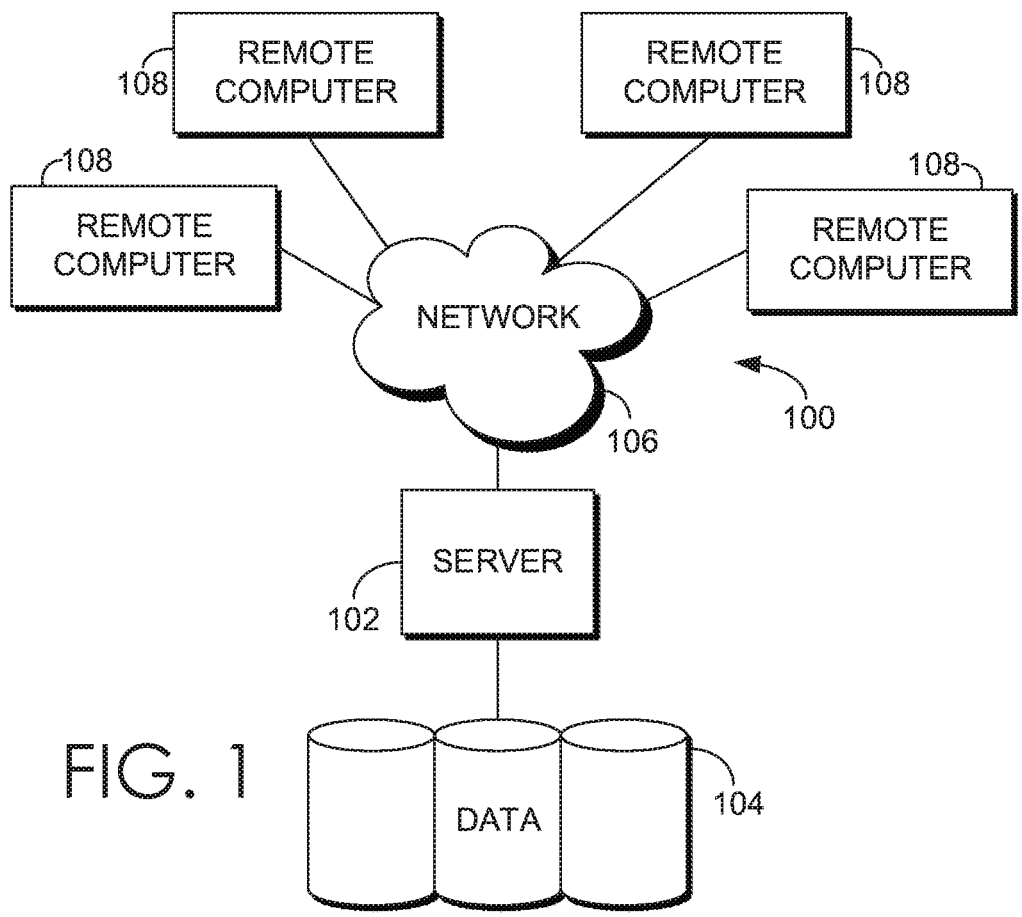
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As noted in the Background, business intelligence tools enable users to reuse graphical components. For example, if a user has a line chart that displays some activity over time, the user can reuse that line chart to display a different activity over time. The ability to reuse that graphical component (i.e., the line chart) makes additional analysis in any area where the user wishes to trend data possible. However, to reuse the line graph in this example, a custom data set must be created and the analysis must be customized. Such customizations require a great deal of time and resources.

Embodiments of the present invention enable the reuse of data structures, data processing, data cleaning, data mapping, analytic concepts, analytic widgets, logic, and graphical components to efficiently provide custom insights to new areas (i.e., model instances). Embodiments of the present further enable the reuse of data structures, data processing, data cleaning, data mapping, analytic concepts, analytic widgets, logic, and graphical components created for a single model to be reused components across new models, which enables new models to be efficiently created for a completely separate set of analytics. To do so, a model is inimitably created by creating, cleaning, and/or mapping a data concept and creating widgets that provide analytic capabilities for the model. These data concepts and widgets are specifically designed to be reused across models and model instances for a plurality of clients or users. Any data concepts and widgets of the model can also be modified to provide a customized solution (i.e., a model instance). Customizations of the model instances can also be reused to efficiently provide additional insights to existing models.

A model, as used herein, is a completely separate set of analytics focused on a particular model's use case and needs. For example, a workflow analytics model provides analytic insights within a generic workflow or process. A cohort analytics model provides analytic insights within a generic cohort or population metrics. An access analytics model provides analytic insights within a generic scheduling or utilization of resources. Each model focuses on an entirely disparate area of analytics and may take months to build out as each model has different analytic needs.

Once a model is created, embodiments of the present invention enable model instances to be created within a model by taking the generic concepts of the model and creating a specific model instance. In this way, insights that have been created for a particular model can be reused and applied to a model instance so all the effort spent creating the model can be quickly leveraged for specific use cases. For example, a workflow model can leveraged to create a support tickets workflow model instance, a discharged not final billed (DNFB) process model instance, an accounts receivable denials workflow model instance, a referral workflow model instance, and the like. In the say way, a cohort model can be leveraged to create a diabetes model instance, a hypertension model instance, a heart failure model instance, a spinal procedures model instance, and the like.

A model instance, as used herein, is created by bringing in a new type of subject area to be analyzed by an existing model. Each model instance of a particular model comprises generic concepts. If a model is for workflow, for example, then a model instance might be different workflows a user wishes to perform analytics on (e.g., a support tickets workflow, a discharged not final billed (DNFB) process, an accounts receivable denials workflow, or a referral workflow). Users or clients may add their own custom logic into the automated workflow provided by embodiments of the present invention to further customize the analytics for their particular implementation of a model instance (i.e., a model instance implementation) at that user's or client's site. By way of example, the client may add custom mapping logic on an existing filter or compare field that is exposed by the model instance, tweak the default natural language processing (NLP) logic utilized by the model instance, or create a brand new filter or compare field specifically added for their model instance implementation.

Accordingly, in one aspect, an embodiment is directed to one or more computer storage media having computer-executable instructions embodied thereon that, when executed by a computer, causes the computer to perform operations that facilitate utilizing reusable analytics for providing custom insights. The operations include receiving a request for analytics corresponding to data received from a first client of a group of clients. The operations also include identifying a model or model instance comprising generic concepts that corresponds to the request for analytics. The operations further include processing the data in accordance with the model or model instance. The processing utilizes the generic concepts of the model or model instance to create a first client model instance. The operations also include enabling other clients of the group of clients to submit requests for analytics that reuse first client generic concepts of the first client model instance to create other model instances.

In another aspect of the invention, an embodiment of the present invention is directed to a computerized method that facilitates utilizing reusable analytics for providing custom insights. The method includes providing, at an analytics service, a plurality of models and model instances to a plurality of users. Each model and model instance comprises generic concepts. The method also includes, upon receiving a selection of a model or model instance of the plurality of models and model instances by a first user of the plurality of users at the analytics service, processing a selection of data received from the user in accordance with the selection of the model or model instance. The method further includes, based on the processing, creating a user model instance of the model or model instance. The method also includes receiving, from the user, client-specific display labels, custom concepts, client field level logic, natural language processing logic, or time range selection for display of the data. The method further includes storing user generic concepts of the user model instance at the analytics service.

In a further aspect, an embodiment is directed to a computerized system that includes one or more processors and a non-transitory computer storage medium storing computer-useable instructions that, when used by the one or more processors, cause the one or more processors to: provide, at an analytics service, a plurality of models and model instances to a plurality of users, each model comprising generic concepts; upon receiving a selection of a model or model instance of the plurality of models and model instances by a first user of the plurality of users at the analytics service, process a selection of data received from the user in accordance with the selection of the model or model instance; and provide an analytics interface to the user corresponding to the selection of data and the model or model instance, the analytics interface providing a first user model instance based on the selection of data processed at the analytics service, the first user model instance comprising first user generic concepts stored at the analytics service and available for reuse by other authorized users.

An exemplary computing environment suitable for use in implementing embodiments of the present invention is described below. FIG. 1 is an exemplary computing environment (e.g., medical-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein.

The present invention might be operational with numerous other purpose computing system environments or configurations. Examples of well-known computing systems, environments, and/or configurations that might be suitable for use with the present invention include personal computers, server computers, hand-held or laptop devices, multi-processor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The control server 102 typically includes therein, or has access to, a variety of computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, ambulatory settings, medical billing and financial offices, hospital administration settings, home healthcare environments, clinicians' offices, Center for Disease Control, Centers for Medicare & Medicaid Services, World Health Organization, any governing body either foreign or domestic, Health Information Exchange, and any healthcare/ government regulatory bodies not otherwise mentioned. Clinicians may comprise a treating physician or physicians; specialists such as intensivists, surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; students; and the like. The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
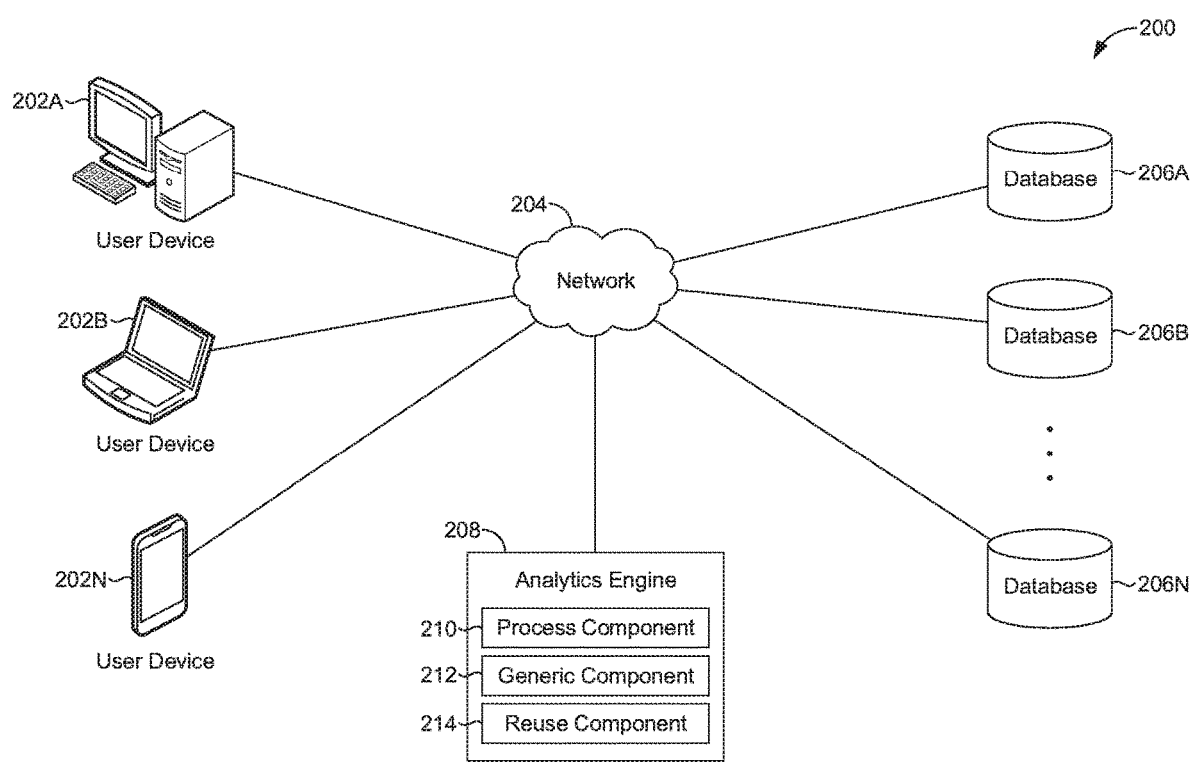
FIG. 2 is a block diagram of an exemplary system for providing reusable analytics, in accordance with an embodiment of the present invention.

Turning now to FIG. 2, an exemplary reusable analytics system 200 is depicted suitable for use in implementing embodiments of the present invention. The reusable analytics system 200 is merely an example of one suitable computing system environment and is not intended to suggest any limitation as to the scope of use or functionality of embodiments of the present invention. Neither should the reusable analytics system 200 be interpreted as having any dependency or requirement related to any single module/ component or combination of modules/components illustrated therein.

The reusable analytics system 200 includes user device(s) 202A-202N, one or databases 206A-206N, and analytics engine 208, all in communication with one another via a network 204. The network 204 may include, without limitation, one or more secure local area networks (LANs) or wide area networks (WANs). The network 204 may be a secure network associated with a facility such as a healthcare facility. The secure network 204 may require that a user log in and be authenticated in order to send and/or receive information over the network 204.

In some embodiments, one or more of the illustrated components/modules may be implemented as stand-alone applications. In other embodiments, one or more of the illustrated components/modules may be distributed across multiple analytic engines 208. The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, the analytics engine 208 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Each of the database(s) 206A-206N is configured to store information for use by, for example, the user devices 202A-202N or the analytics engine 208. The information stored in association with each of the database(s) 206A-206N is configured to be searchable for one or more items of information stored in association therewith. The information stored in association with the database(s) 206A-206N may comprise general information used by the reusable analytics system 200, the user devices 202A-202N, and/or the analytics engine 208. For example, the information may be data structures, data processing, data cleaning, data mapping, analytic concepts, analytic widgets, logic, and graphical components data structures, data processing, analytic concepts, and graphical components that have been created to efficiently provide custom insights to new areas. The information stored in association with the database(s) 206A-206N may be received from other systems (e.g., disparate healthcare systems), which may include any number or type of medical devices that may be utilized to provide or measure patient care to a patient.

In embodiments, the database(s) 206A-206N may store electronic health records (EHRs) of patients associated with one or more healthcare facilities. EHRs may comprise electronic clinical documents such as images, clinical notes, orders, summaries, reports, analyses, or other types of electronic medical documentation relevant to a particular patient's condition and/or treatment. Electronic clinical documents contain various types of information relevant to the condition and/or treatment of a particular patient and can include information relating to, for example, patient identification information, images, alert history, culture results, physical examinations, vital signs, past medical histories, surgical histories, family histories, histories of present illnesses, current and past medications, allergies, symptoms, past orders, completed orders, pending orders, tasks, lab results, other test results, patient encounters and/or visits, immunizations, physician comments, nurse comments, other caretaker comments, and a host of other relevant clinical information. In some embodiments, the data store 304 may include data received from health information exchanges ("HIEs"), personal health records ("PHRs"), patient claims, and other health records associated with a patient. Although described with respect to healthcare information, it is contemplated the database(s) 206A-206N may store any type of records or information received from other systems, which may include any number or type of devices that may be utilized to provide or measure any data, that may benefit from analytics.

User device(s) 202A-202N may be any type of computing device used within a healthcare facility to receive, display, and send information to a user, such as a clinician. User device(s) 202A-202N may be capable of communicating via the network 204 with the analytics engine 208 or databases 206A-206N. Such devices may include any type of mobile and portable devices including cellular telephones, personal digital assistants, tablet PCs, smart phones, and the like.

User device(s) 202A-202N are configured to display information to a clinician via a display. The information may include communications initiated by and/or received by the analytics engine 208. Embodiments are not intended to be limited to visual display but rather may also include audio presentation, visual presentation, combined audio/visual presentation, and the like.

Components of the analytics engine 208 may include a processing unit, internal system memory, and a suitable system bus for coupling various system components, including one or more data stores for storing information (e.g., files and metadata associated therewith). The analytics engine 208 typically includes, or has access to, a variety of computer-readable media.

The reusable analytics system 200 is merely exemplary. While the analytics engine 208 is illustrated as a single unit, it will be appreciated that the analytics engine 208 is scalable. For example, the analytics engine 208 may in actuality include a plurality of computing devices in communication with one another. The single unit depictions are meant for clarity, not to limit the scope of embodiments in any form.

As shown in FIG. 2, the analytics engine 208 comprises, in various embodiments a process component 210, a generic component 212, and a reuse component 214. In some embodiments, one or more of the components may be implemented as stand-alone applications. It will be understood that the components illustrated in FIG. 2 are exemplary in nature and in number and should not be construed as limiting. Any number of components may be employed to achieve the desired functionality within the scope of embodiments hereof.

Generally, the analytics engine 208 is configured to provide an approach to analyze any type of study that can be applied across any venue. Initially, the analytics engine 208 provides a plurality of models and model instances to a plurality of users. Each model and model instance comprises generic concepts. This enables the reuse of an entire analytical suite of reports focused on a given area (e.g., analytics that relate to the particular study). This also enables a user to quickly find variances, outliers, process flow stoppages, and the like for a given study without the need to create custom analytics or customize the data.

For example, assume a user wishes to create a set of analytics for the workflow of a claim moving through the process of being validated so it can be billed correctly. The user also wishes to create a similar set of analytics for the workflow of answering a support ticket logged for a particular product. Currently, this takes several months of separate effort to create each set of analytics. However, even though these are totally different processes, each set of analytics can be analyzed by the analytics engine as a process flow with similar concepts (e.g., a start and stop date or time, several sub steps, and the like). Thus, the analytics engine 208 enables generic holders to be created for each concept that allows different or specific data to be used in the same bucket (i.e., holder).

Once the generic holders are created, the analytics engine 208 enables a generic model to be created as well. In this way, when viewed as a solution, all generic verbiage is replaced by analytics engine 208 with specific example verbiage, so the analytics appears fully customized for each example. For every new analytics example or concept that is introduced to the analytics engine 208, a new way to realize insights is added without the need to create custom analytics or customize the data. That concept can be made generic, added to the overall solution, and any example or use cases can reuse it, since all workflows or processes can gain the same insight for specific needs.

If the user wants to analyze the process of buying a car, the data can be communicated to the analytics engine 208, where it can be assimilated into a generic model, specific labels or customizations can be added for display for this use case, and very easily and quickly, a deep analytic solution that can give dozens of new insights in a matter of days versus months. In other words, the analytics engine 208 enables the analytics model itself to be reused for any set of data, and labels or other customizations can be made to the displayed solution and later shared as a new model instance.

In this way, the analytics engine 208 provides analytics on demand that enables model instances to be added for various use cases and generic concepts from the model instances to be reused across disparate use cases or data. This enables a significant percentage of analytics problems to be solved without setting up analytic models specific to a request. In embodiments, the analytics engine 208 simply identifies an appropriate model (e.g., workflow, relationship management, cohorts, and the like) or model instance (if one already exists for the particular use case) and plugs in the data.

Process component 210 is generally configured to process a selection of data received from the user (i.e., a client) in accordance with the selection of a model or model instance. In embodiments, the selection of the model or model instance may be made at an analytics service (e.g., the analytics engine 208) by a first user of a plurality of users. In embodiments, the data includes reference data and activity data. The data may be processed by mapping source specific values and client-specific values of the data to a standardized nomenclature. In this way, so long as the data is in a format recognized by process component 210, the data may be mapped to the standardized nomenclature of the model or model instance. In some embodiments, the reference data originates from disparate sources and is merged into a single record.

Generic component 212 is generally configured to assist the process component 210 by removing client-specific words and phrases from the data that do not impact the model or model instance. Additionally or alternatively, the generic component 212 may modify client-specific words and phrases of the data to provide additional insights to the model or model instance. In embodiments, generic component 212 receives, from the user, client-specific display labels, custom concepts, client field level logic, natural language processing logic, or time range selection for display of the data by the model or model instance to customize the resulting model instance. Generic component 212 may additionally provide an analytics interface to the user corresponding to the selection of data and the model or model instance.

In some embodiments, the generic component 212 cleanses the data to make the analytics more accurate. For example, if concurrent duplicate steps are included in the data, they can be removed and combined into a single step. In a workflow example, the steps (or states) of the workflow are sorted in a time sequence. If the same step appears more than once and also concurrently, those steps are merged into a single step to clean up erroneous data from the source. In a more specific clinical referral example, the following steps may be used: sent, accepted, scheduled, and patient seen. If there are three accepted steps in a row on the timeline, those three accepted steps are combined into a single accepted step and the start and end dates are adjusted accordingly. If on the other hand, the three accepted steps are not concurrent, the three steps are left as is so an accurate timeline of status that might bounce back and forth between steps (or states) is captured.

In some embodiments, the generic component 212 adds additional value to the data to create additional insights. For example, automated steps can be documented and showcased appropriately. If a step (or state) takes less than a predefined set of time (determined by a workflow or client), then it may be flagged as an automated step. Once flagged, the automated steps can also be excluded if the user wishes to drill further into how to improve the manual steps within a workflow.

In another example, gaps in the process can be identified and new steps can be created to showcase the gaps to create new analytic insights. Once the steps (or states states) of a workflow are sorted in a time sequence, gaps where one step ends prior to the next step starting may indicate gaps. When these occurrences are identified, a gap step may be created so items within the workflow where no documented step (or state) occurred are accounted for. Additionally, a length of time for the gaps is also detailed in the gap step.

In another example, a single primary step path can be identified to create new analytic insights. Within some workflows there may be several steps (or states) that occur in parallel. In this case, a single step may be defined as the primary driver for that workflow. Specific analysis can be performed on that single step and new start and end dates may be determined for that step based on priority logic between the other steps that occurred in parallel.

In another example, test data may be flagged so it is not included as part of the default analytics. For example, in some instances, the source data may include test data. Rules may be established on a per workflow bases that enables the data to be flagged appropriately and excluded from the analysis by default. If the user wishes to analyze the test data as well, the user may override the default.

In another example, workflow specific data cleansing may be performed. For example, if the source data has errors in it or is incomplete in some way, the generic component 212 may perform a detailed analysis of the source data and identify the errors or incomplete data. The detailed analysis may be based on the workflow corresponding to the source data being analyzed.

Reuse component 214 is generally configured to enable users to reuse generic concepts of the models or model instances that may be stored at the analytics service. As mentioned, the generic concepts may include data structures, data processing, data cleaning, data mapping, analytic concepts, analytic widgets, logic, and graphical components. The reuse component 214 may also enable the first client to add custom logic to customize the model instance. Once the model instance is created, access to generic concepts of the instance model can be provided to other clients of the group of clients.

In some embodiments, analytics engine 208 enables the user to select any data field included in the model instance and group the views by the selected data to compare individual values of the field against each other. Additionally, the most significant data points are displayed for the current model instance. These data points can be viewed, sorted, exported, or utilized to find a specific record. Predictive future states of the data (e.g., linear regression) may also be displayed. The user may also switch between analytic views to see another set of data in the current model instance. In a similar fashion, the user may switch to a different instance the user has access to view the analytics for the current set of data.

In practice, the analytics engine 208 provides a generic approach to analyze any type of study and can be applied across any venues. For example, in a healthcare revenue cycle setting, an executive might look at high level trends for outliers to pass along to an analyst for further investigation (e.g., root cause analysis).

At a high level, the revenue cycle example is configured to analyze a process (i.e., the lifecycle of a set of claims). In a similar fashion, the process could analyze the cycle of a patient moving through an emergency department. Returning to the revenue cycle, the analytics engine 208 may be analyzing DNFB process. Once a claim enters the DNFB process, it is in backlog until it is resolved and, ultimately, billed. A line chart that may be provided by the analytics engine 208 may indicate the process is fairly steady. That may indicate that the claims are being billed without any significant delays. If on the other hand, the backlog is growing over time, or the backlog suddenly increases, the analyst may desire to drill down into lower level details to identify possible root causes.

The analyst may also be able to identify the number of days needed to clear the backlog. To do so, the analytics engine 208 analyzes the amount of backlog and the difference between new and resolved claims. The analytics engine 208 can also identify the current burn rate.

A sunburst chart may also be provided by the analytics engine 208. The sunburst chart identifies percentages or numbers of a process going through a particular path until it is resolved. In the case of the revenue cycle example, the sunburst chart may indicate that thirty percent of the claims keep going back and forth between two substates (e.g., claim scrubbing and standard delay). The sunburst chart also identifies how long the claim spent in each substate. In this way, the sunburst chart provides a visual depiction of each step in whatever process is being analyzed.

In some embodiments, the analytics engine 208 enables a user to define what path the process should take (e.g., the order and number of substates the ideal process takes). This enables the analytics engine 208 to provide a visual representation of trends of the process being analyzed. Ultimately this indicates when a process is improving or getting worse over time. The analytics engine 208 also enables comparison of a process across regions (or facilities and the like).

In embodiments, the analytics engine 208 provides a detailed table that provides low level details of substates of whatever process is being analyzed. These details can be utilized to help identify root causes. The detailed table may be refreshed with relevant low level data when an item is selected or highlighted in another portion of the display (e.g., a process path being selected in the sunburst chart or a point being selected on the line chart).

Additionally, the analytics engine 208 may enable a user to set filters and configure views of the display. For example, a user may wish to only analyze claims that have gone through a particular order of substates. Breadcrumbs may display what filters are appropriate or what filters have been selected. Data provided by the analytics engine 208 may also be exported to other applications.

With reference to FIGS. 3-38, illustrative screen displays 300, 400, 500 . . . 3800 of embodiments of the present invention are shown. It is understood that each of the illustrative screen displays are connected logically, such that they comprise a user interface designed for providing reusable analytics. The screen displays may appear in any order and with any number of screen displays, without regard to whether the screen display is described or depicted herein. The screen displays provide tools that enable reusable analytics in accordance with embodiments of the present invention.

Figure 3:
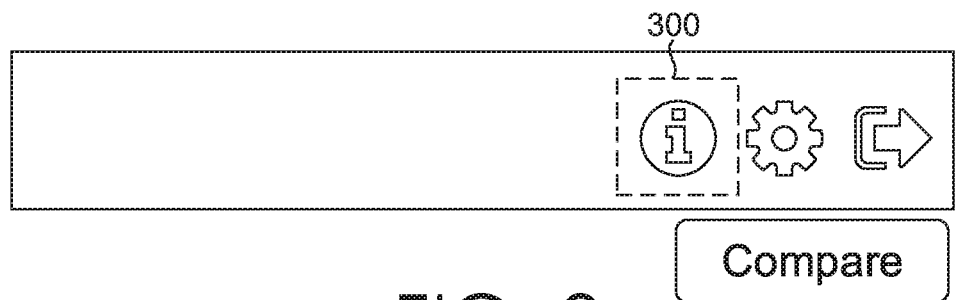
Figure 4:
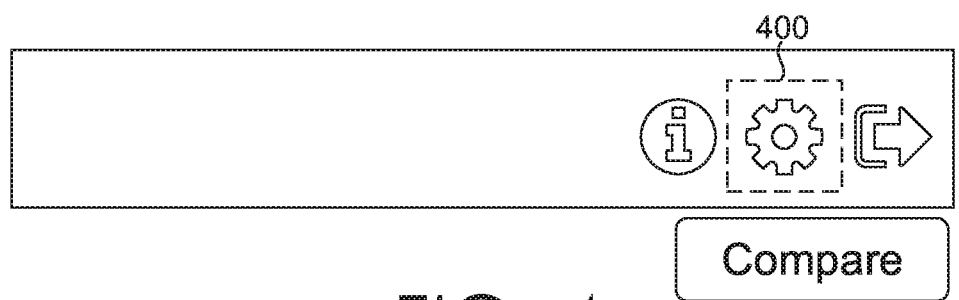
Figure 5:
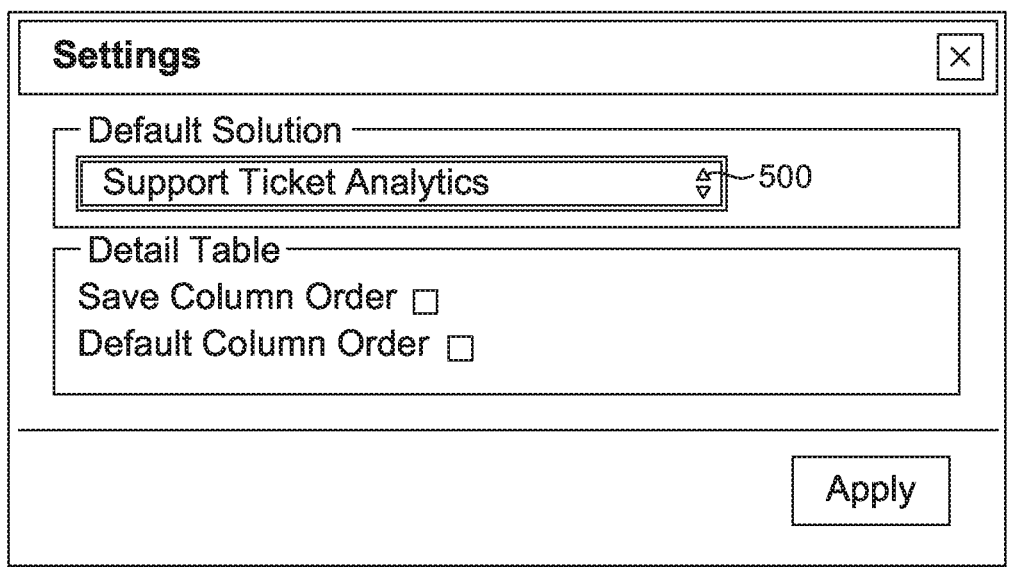
Figure 6:
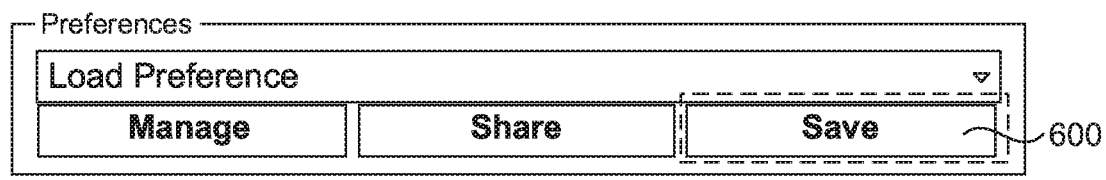
Figure 7:
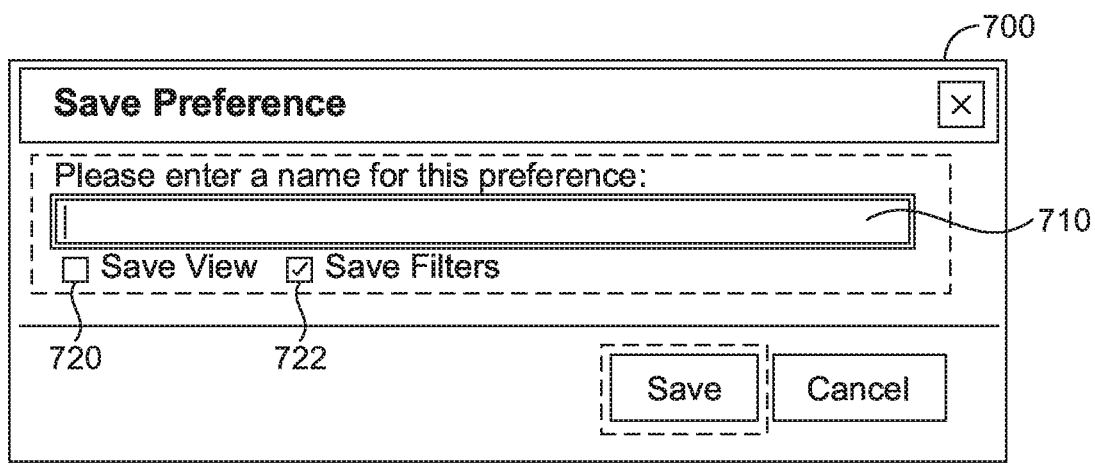
Figure 8:
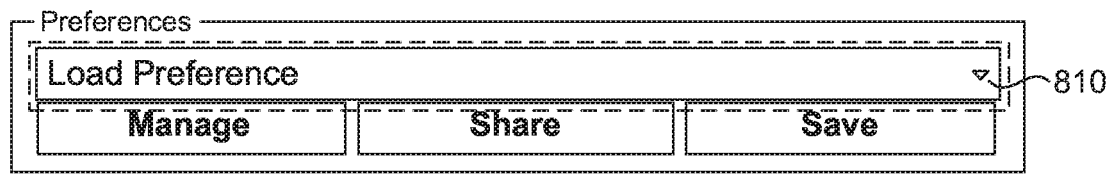
Figure 9:
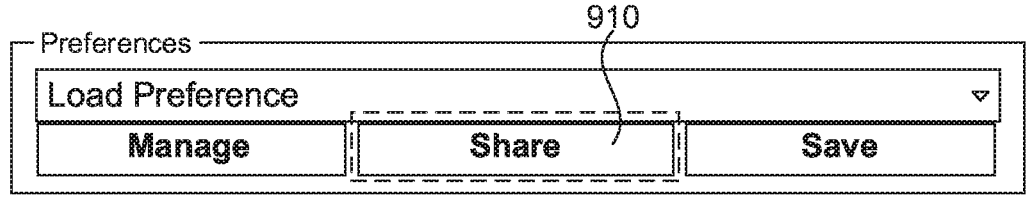
Figure 10:
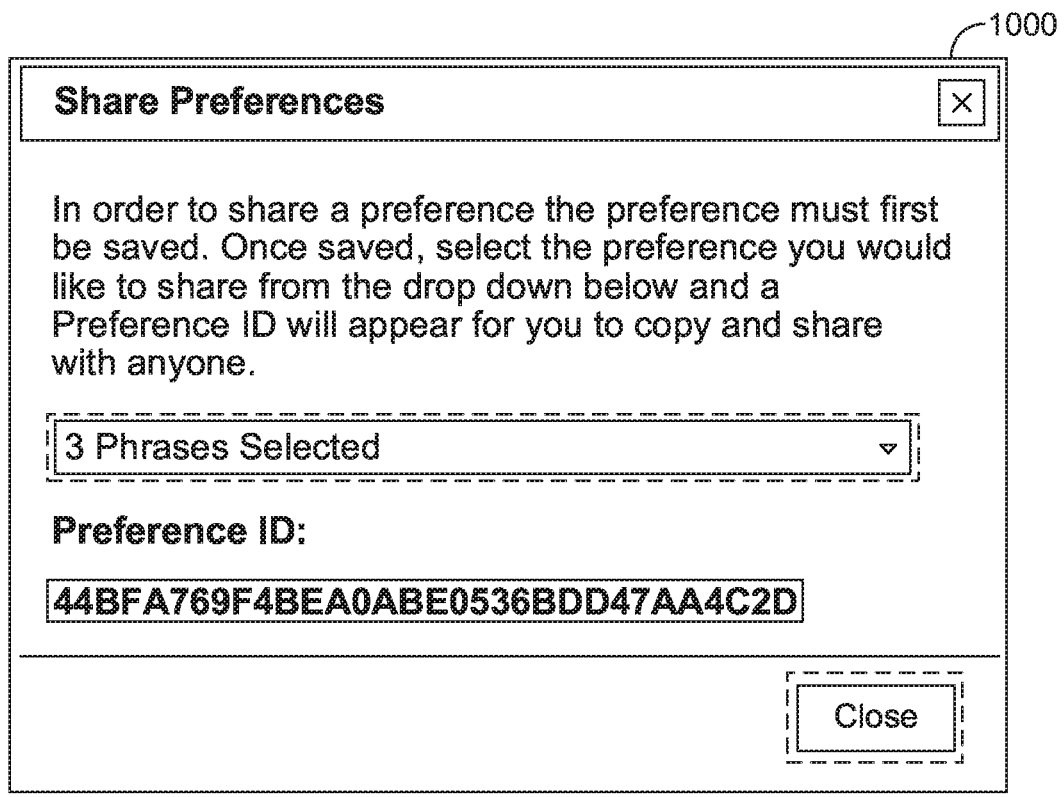
Figure 11:
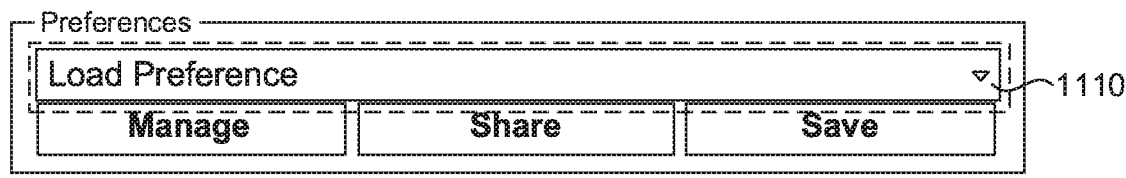
Figure 12:
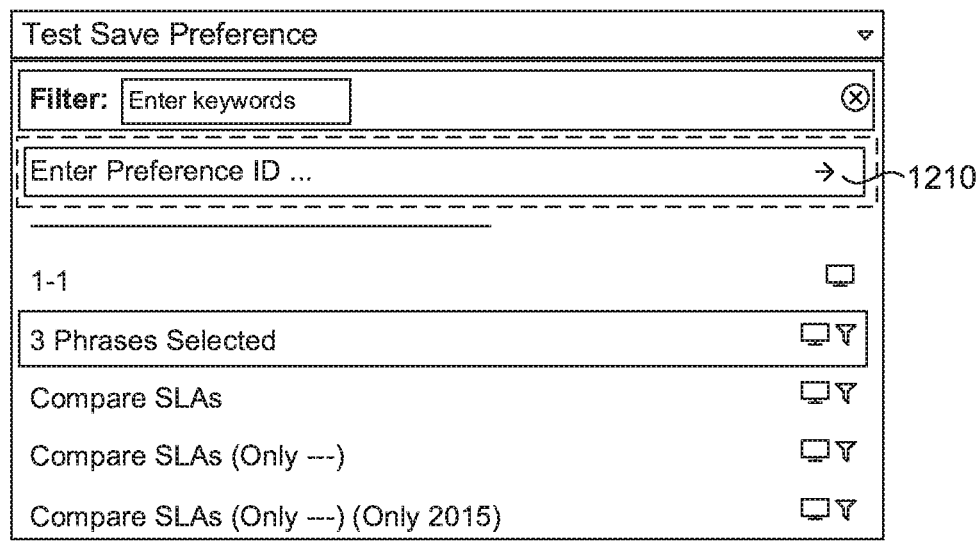
Figure 13:
Figure 14:
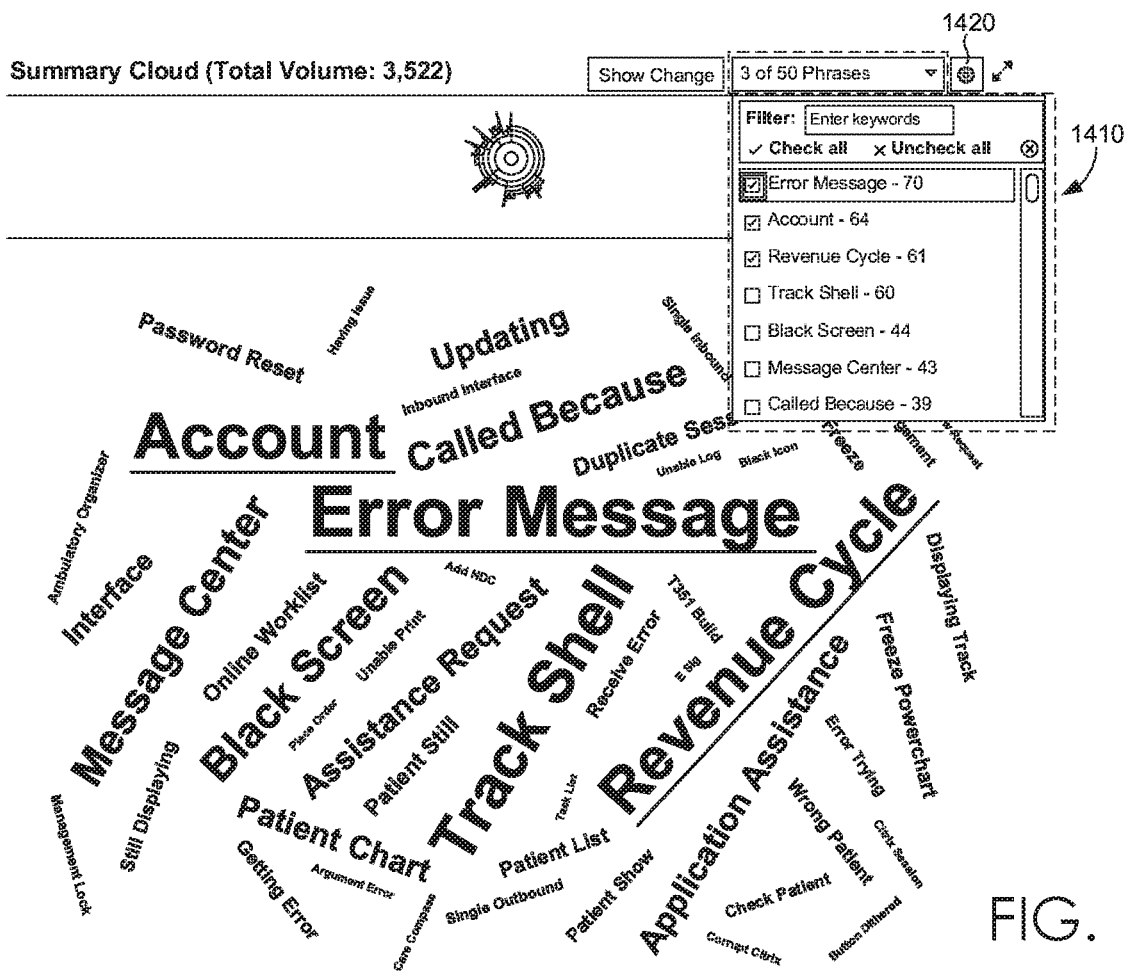
Figure 16:
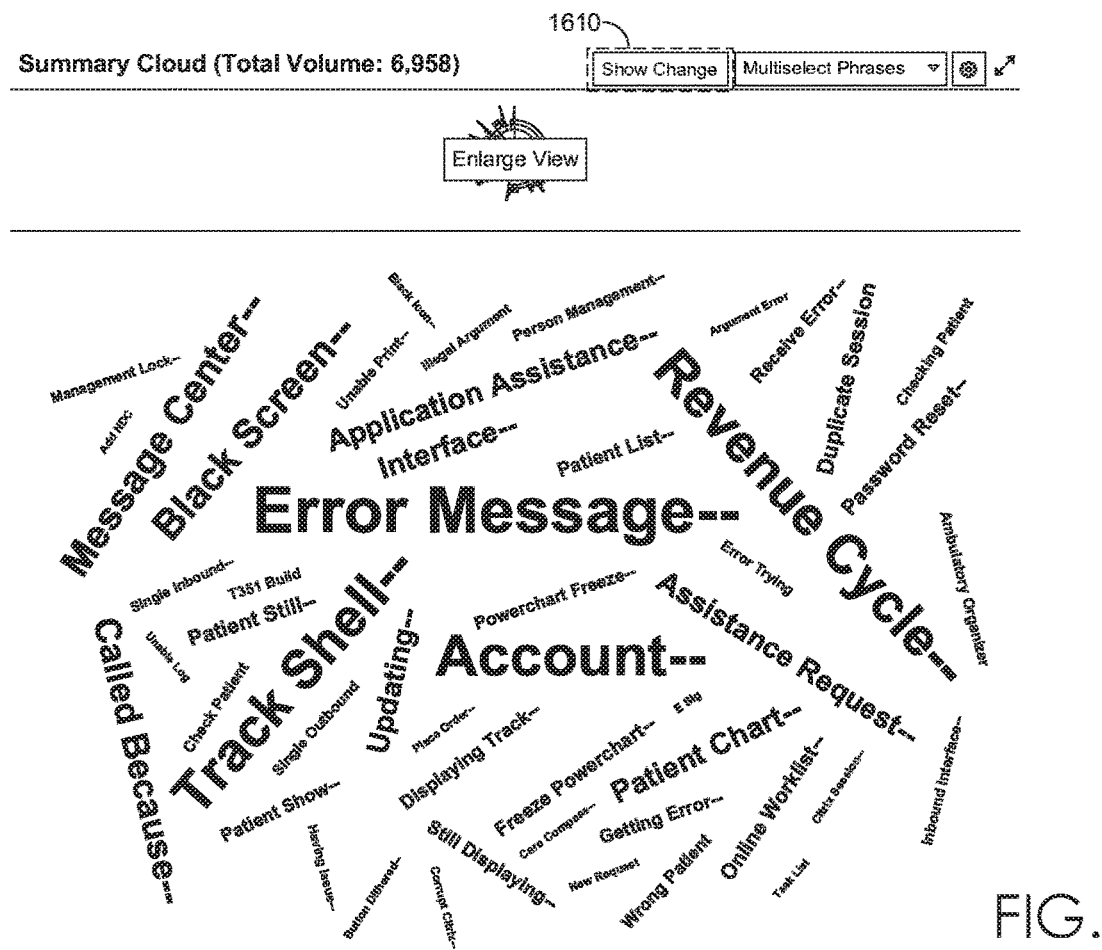
Figure 17:
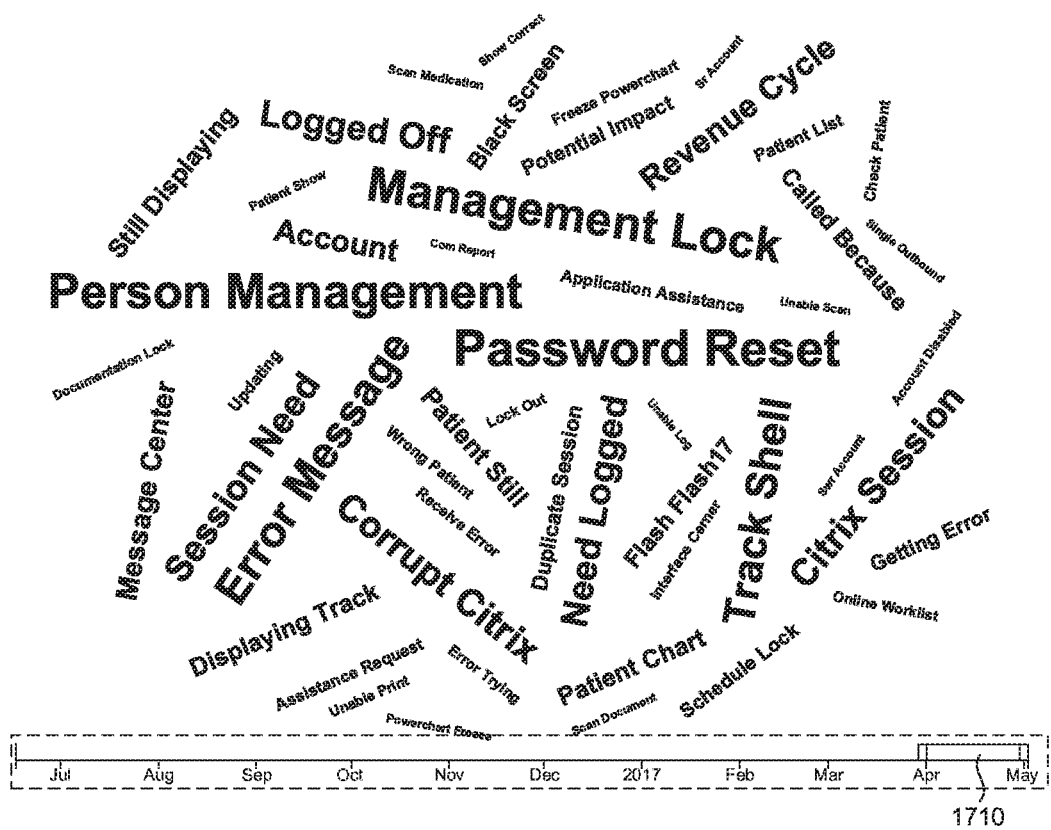
Figure 18:
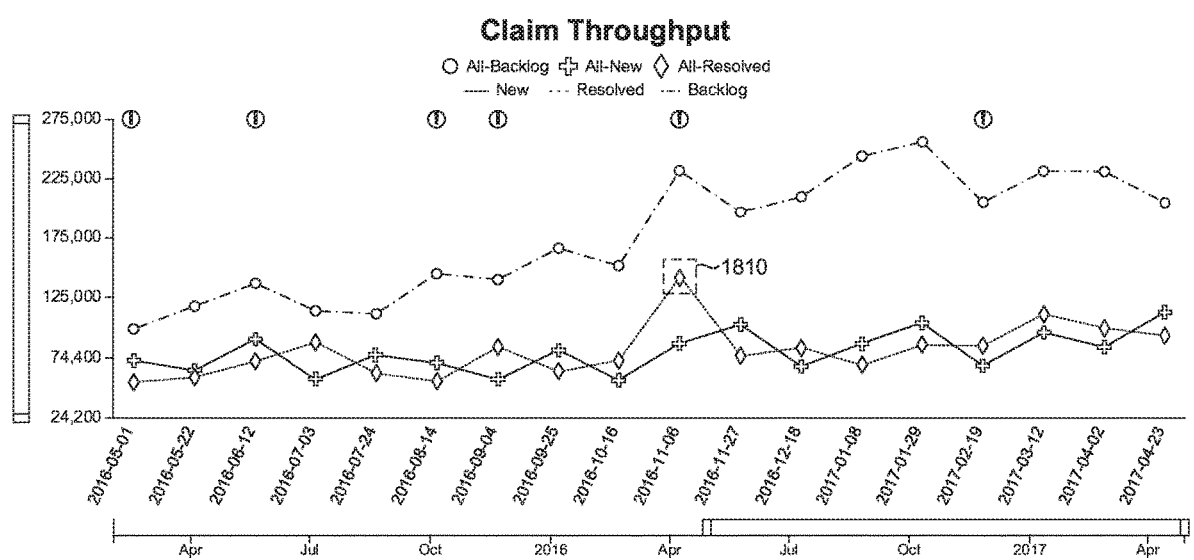
Figure 19:
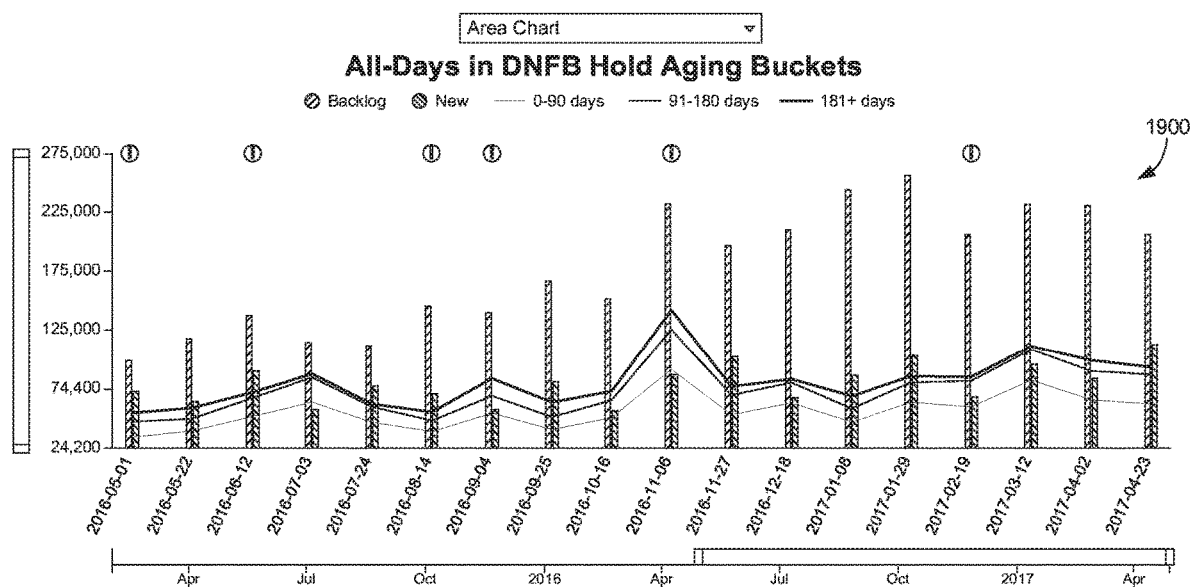
Figure 20:
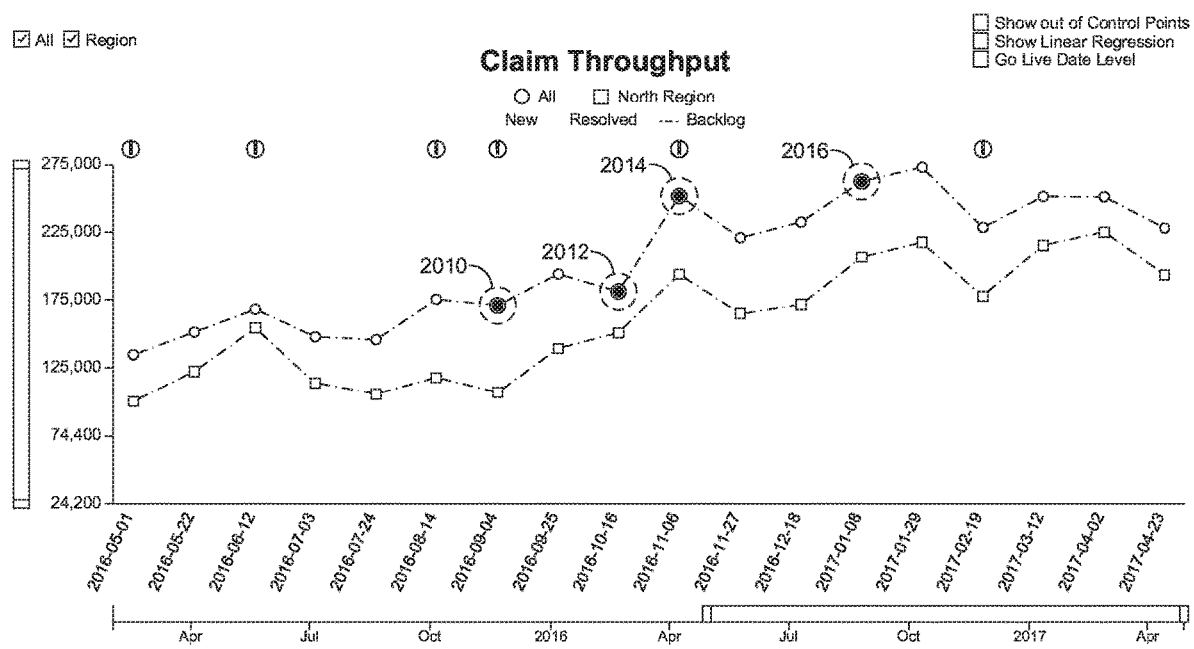
Figure 21:
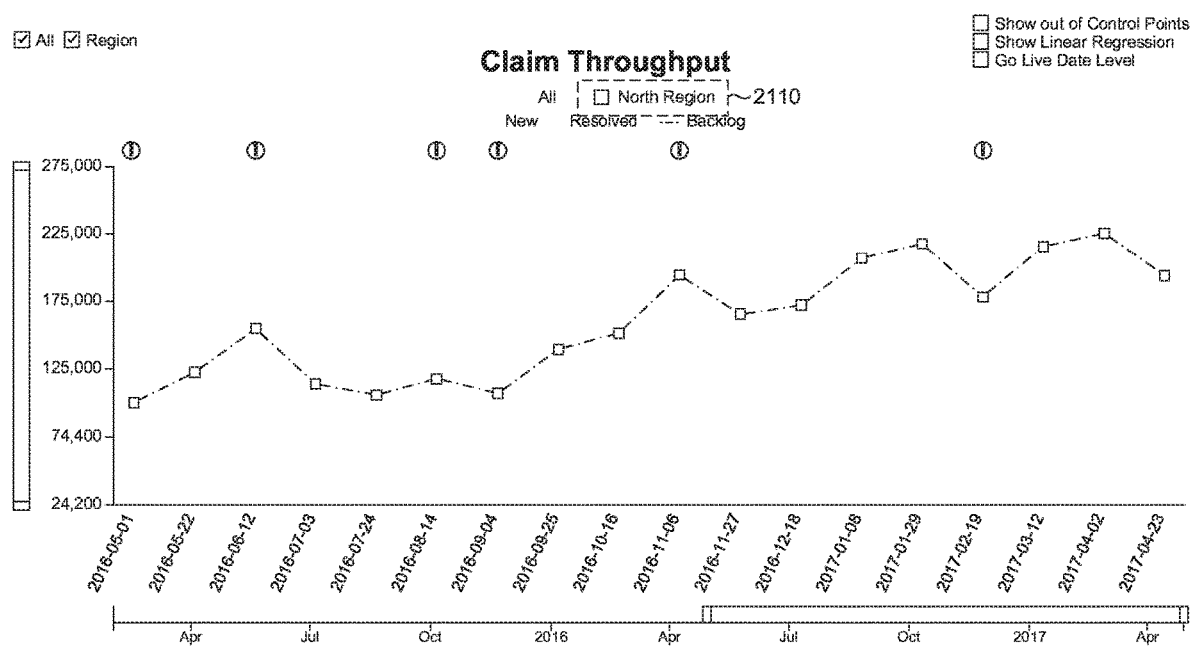
Figure 22:
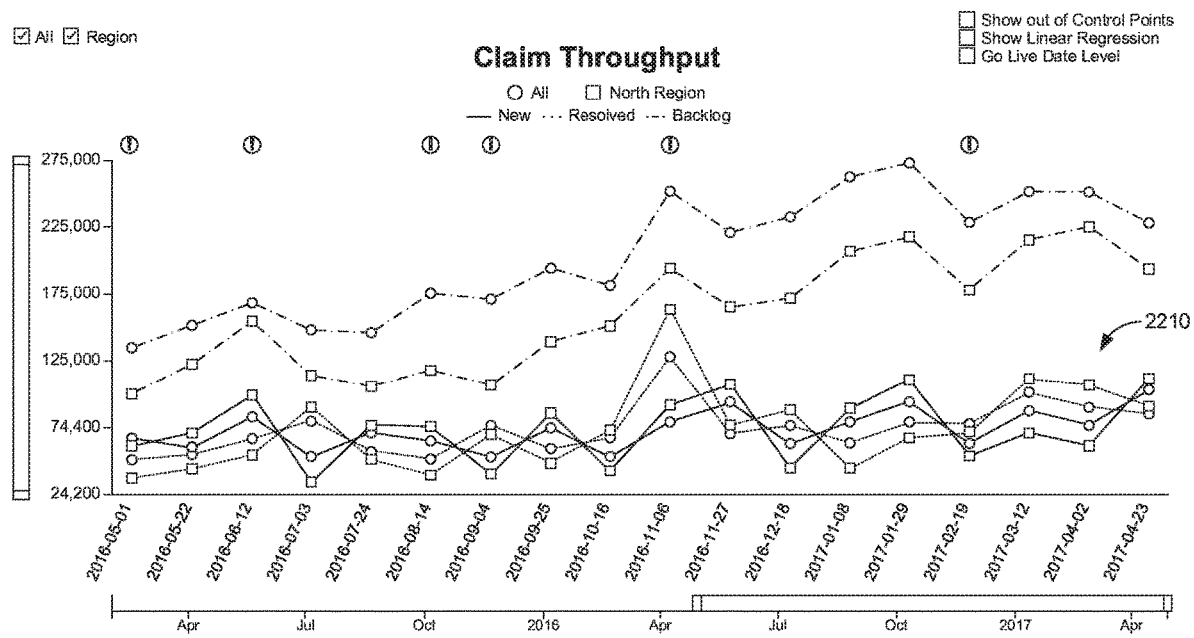
Figure 23:
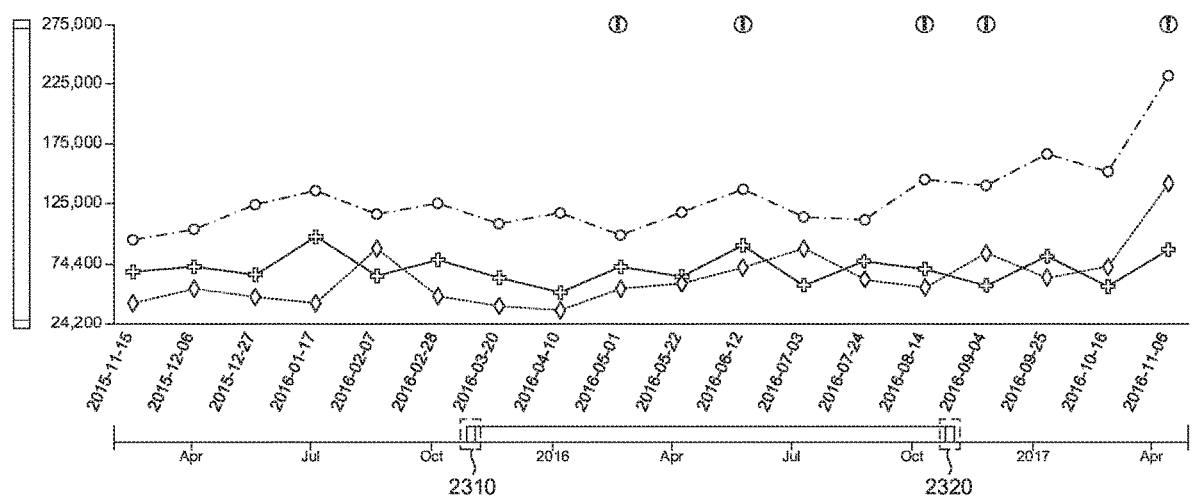
Figure 24:
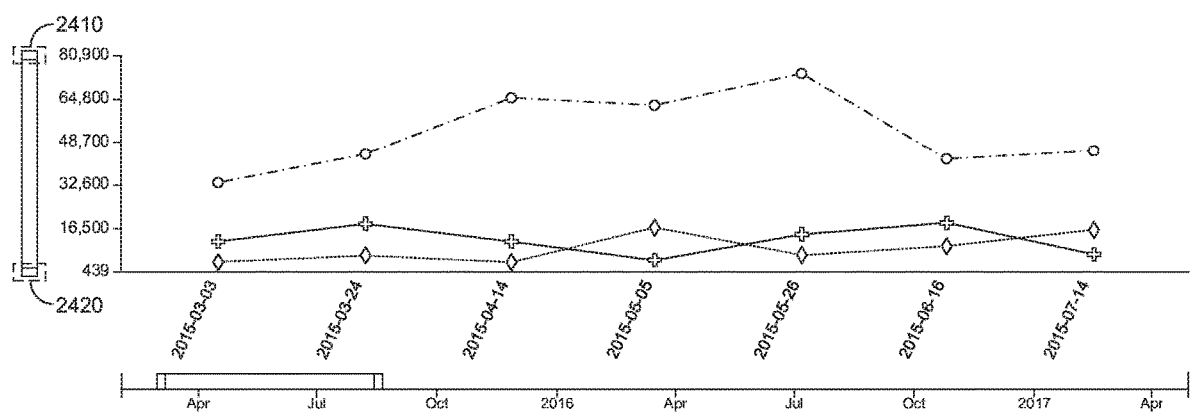
Figure 25:
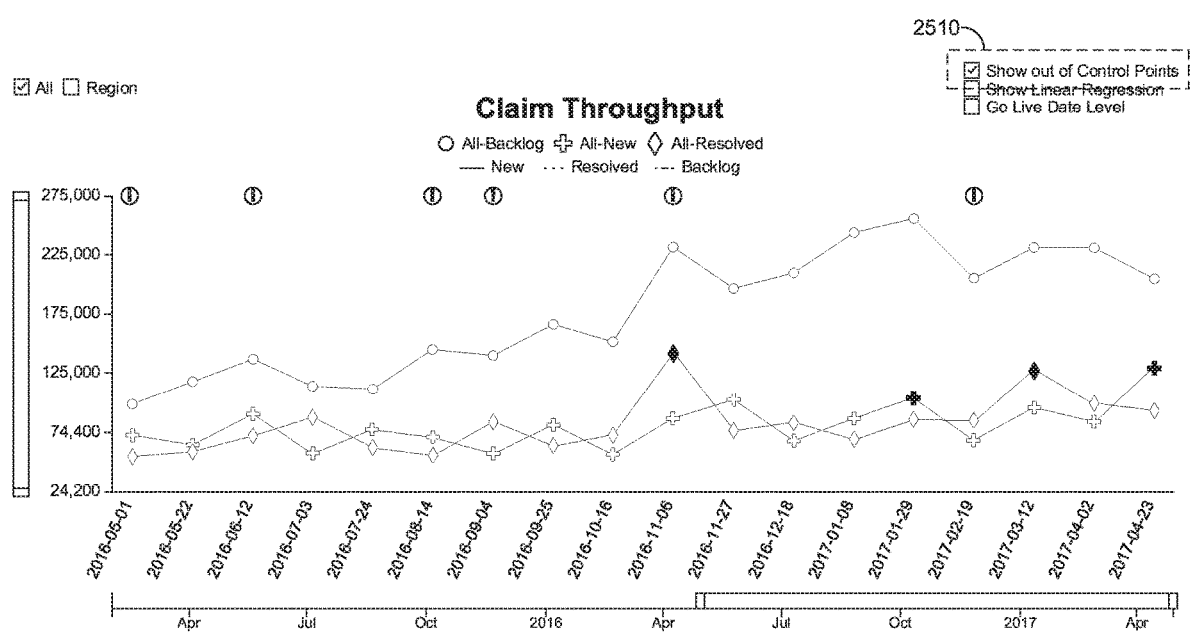
Figure 26:
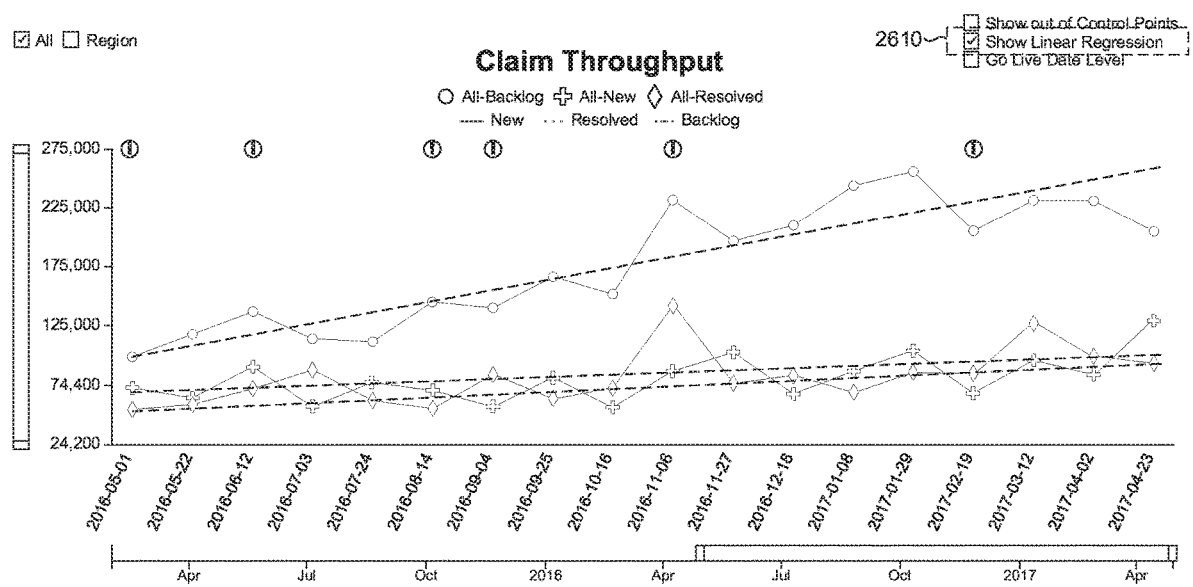

Referring initially, to FIGS. 3-5, a user may select the information icon 300 for instructions on using the reusable analytics system or the settings icon 400 to select a default solution (e.g., a model or model instance comprising generic concepts) 500. Next, as shown in FIGS. 6 and 7, preferences may be selected to allow a user to save a selected view and filters. During this process, the user may select whether to save only filters, only the view, or both the view and the filters. If a saved preference is applied, the workflow is restored back to the state when the preferences was saved. In this way, each filter that was saved is applied, and any view item (e.g., selected data points on a line chart) is reapplied as well.

Upon selecting the save button 610, a dialog box appears 700 that enables a user to name the preference 710 and select whether the user wants to save only filters, only the view, or both the view and the filters 720, 722. For clarity, filters generally refer to inputs or select boxes that filter the data for the reusable analytics system while a view generally refers to a button or drill-in to lower level data.

Referring to FIGS. 9-12, a user may decide to load or share a preference (e.g., a filter or view that the user has created as a custom feature that is applied to the model instance) rather than utilize the standard solution (i.e., the standard filter or view of the model instance). To load a shared preference a user can select the load preference drop down 810. Upon selecting the load preference drop down 810, the user is provided a list of saved preferences. To share a preference, the user can select the share button 910. After clicking the share button 910, a dialog box 1000 appears. At this point, the user can select a saved preference form the drop down and a preference identification appears. The preference identification can be copied (e.g., copied to the clipboard) and communicated to another user. If, on the other hand, the user desires to load a preference that has been shared with the user, the user can select the load preference drop down 1110 and an input box 1210 will appear that enables the user to paste a preference identification that has been shared with the user.

FIGS. 13-17 illustrate a word cloud feature that can be utilized to filter data provided by embodiments of the reusable analytics system. Initially, a word cloud 1300 that includes words or phrases that appear in data provided by the reusable analytics system. A drop down box 1410 enables a user to select one or more phrases to filter the data accordingly (or a user can click on a single word displayed in the word cloud 1300). Selection of a gear button 1420 causes a word cloud display options dialog box 1510 to appear. The show change button 1610 illustrates the top changes in the word cloud (as indicated by a (−, −−, +, ++). A minus indicates a volume decrease while a double minus indicates a sharp volume decrease. A plus indicates a volume increase while a double plus indicate a sharp volume increase. If a phrase is not followed by any changes, the volume has remained constant. As can be appreciated, the logic used to determine the changes can be modified using the word cloud display options dialog box 1510. A brush 1710 below the word cloud enables control over the date range on which the word cloud is filtered.

Referring now to FIGS. 18-26, line chart features for revenue cycle analytics provided by embodiments of the reusable analytics system are illustrated. Initially, a user may click on a data point 1810 to drill into data buckets corresponding to the data point 1810. An area chart 1900 illustrating discharged not final billed (DNFB) buckets provides an indication to the user timeframes for how long it took to bill for patients that had been discharged. Alternatively, a stacked bar chart (not shown) can provide similar details.

In embodiments, the user may select multiple data points. Selection of multiple data points 2010, 2012, 2014, 2016 filters all views on the tab to specific date ranges and filters based on the legend item. For example, if a data point is selected for all, the chart would drill in for all data for the specific date range selected. If a data point is selected for a series other than all, the chart would drill in using the series as a filter along with the date range selected. The chart may also only display the series for the legend selected, such as by the user selecting the desired legend 2110. The other series for unselected legends will be hidden from the display. If the user unselects the desired legend or double clicks on any item in the legend, all the series in the legend will be displayed as illustrated by display 2210.

In embodiments, the ends of a horizontal brush 2310, 2320 may be dragged to expand or decrease a chart's date range. The ends of a vertical brush 2410, 2420 may be dragged to expand or decrease a chart's range corresponding to the unit provided by the vertical axis.

In embodiments, a control points button 2510 enables data points falling outside of two standard deviations to be displayed. A linear regression button 2610 shows linear regression lines in the chart to illustrate where data for each series is trending. Additionally, a three month extrapolation can illustrate where data for each series will go if continued on the same trend.

Figure 29:
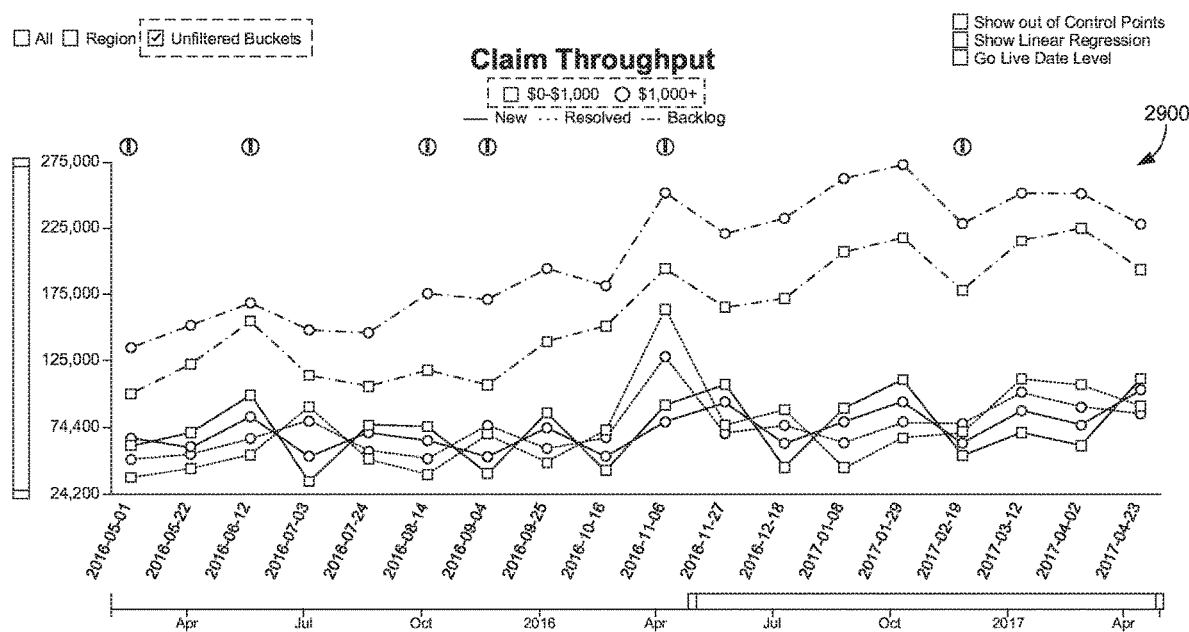

FIGS. 27-29 illustrate multiple filters being compared against each other, in accordance with embodiments of the reusable analytics system. For example, filters corresponding to particular healthcare facilities 2710, 2720, 2730, 2740, 2750 may enable a user to compare a particular study (e.g., revenue cycle) among the facilities to determine if one facility has a better record of DNFB. Additionally, a range of figures 2810 (e.g., unbilled claim amount) can be selected to compare among the selected facilities. The chart is then updated to enable the user to quickly assimilate a number of DNFB claims as well as a dollar amount.

Figure 30:
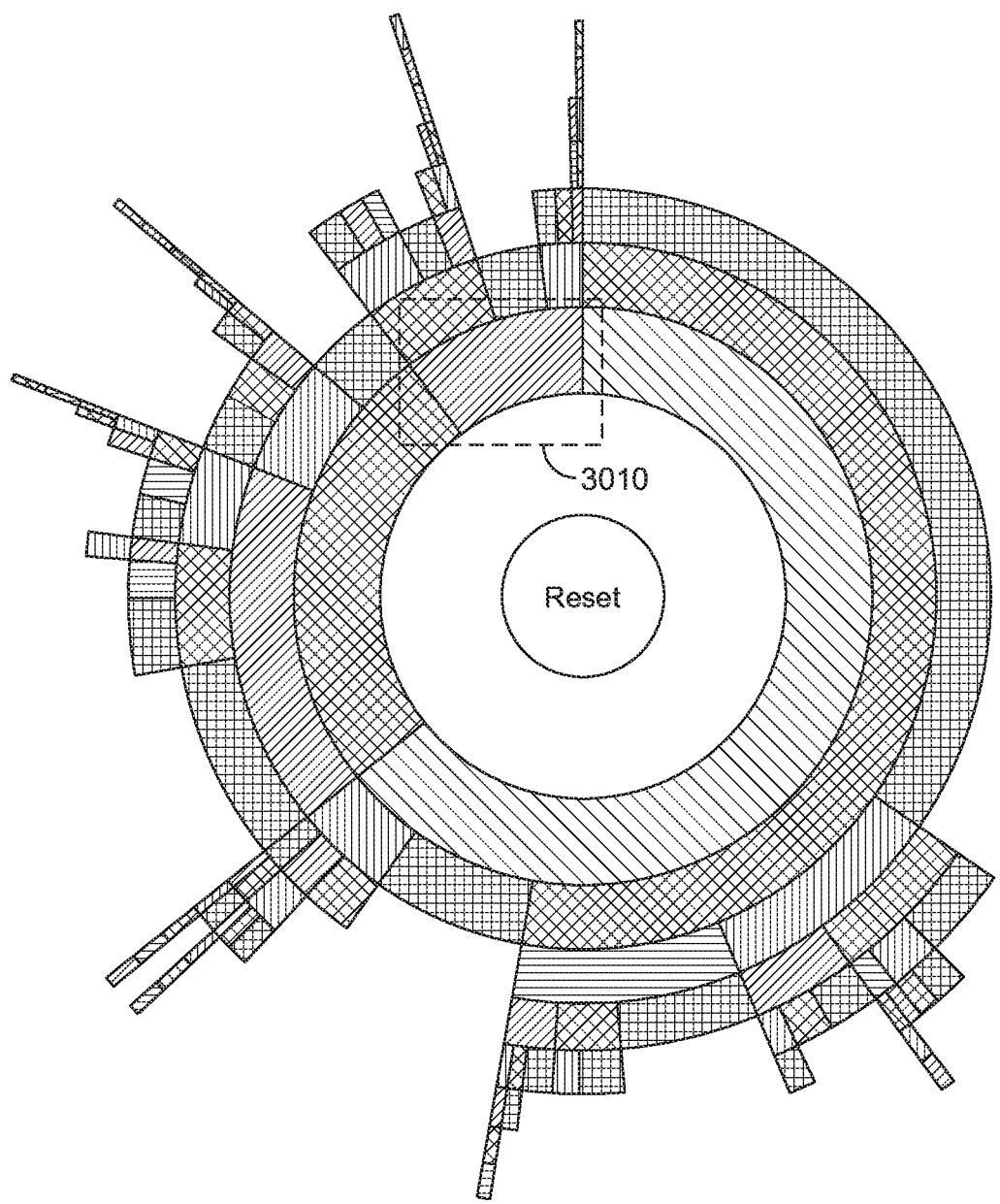
Figure 31:
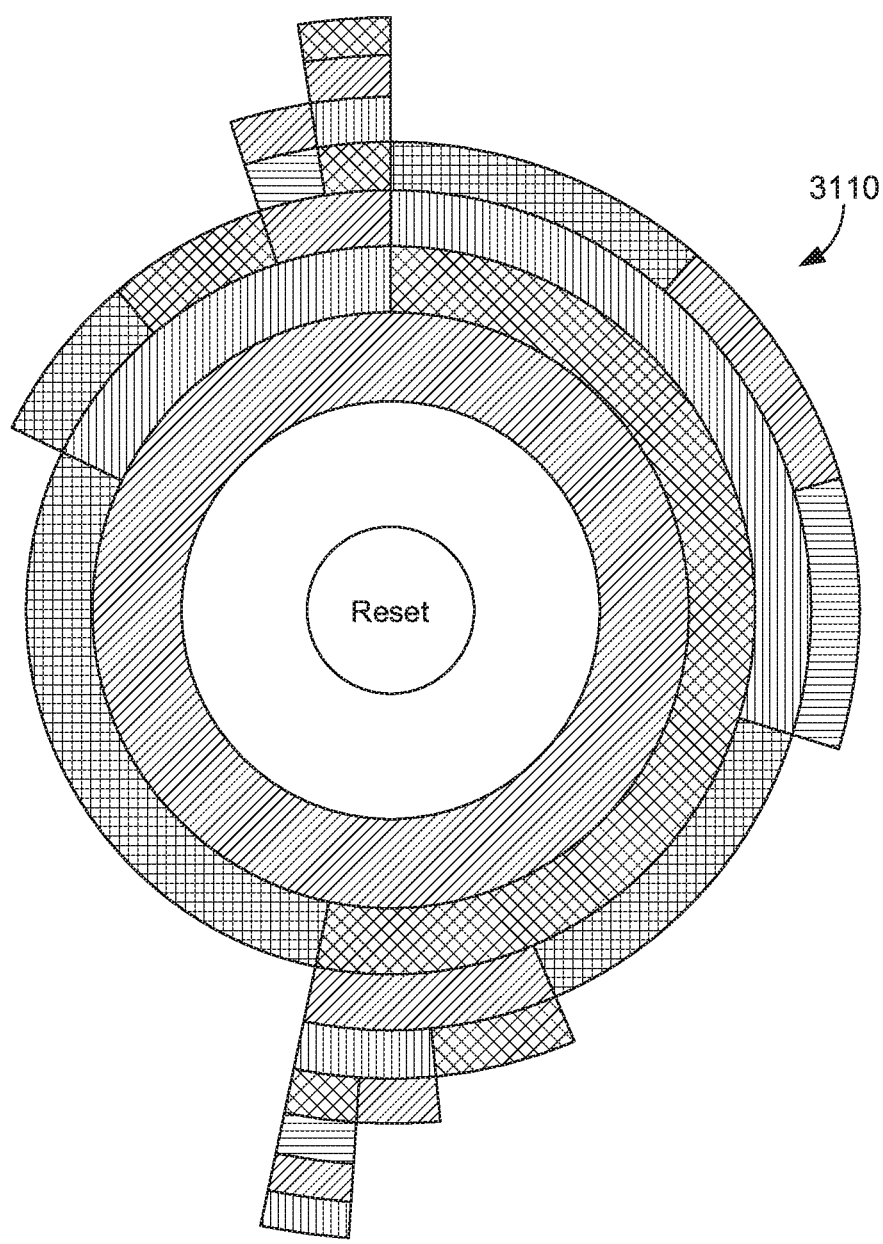
Figure 32:
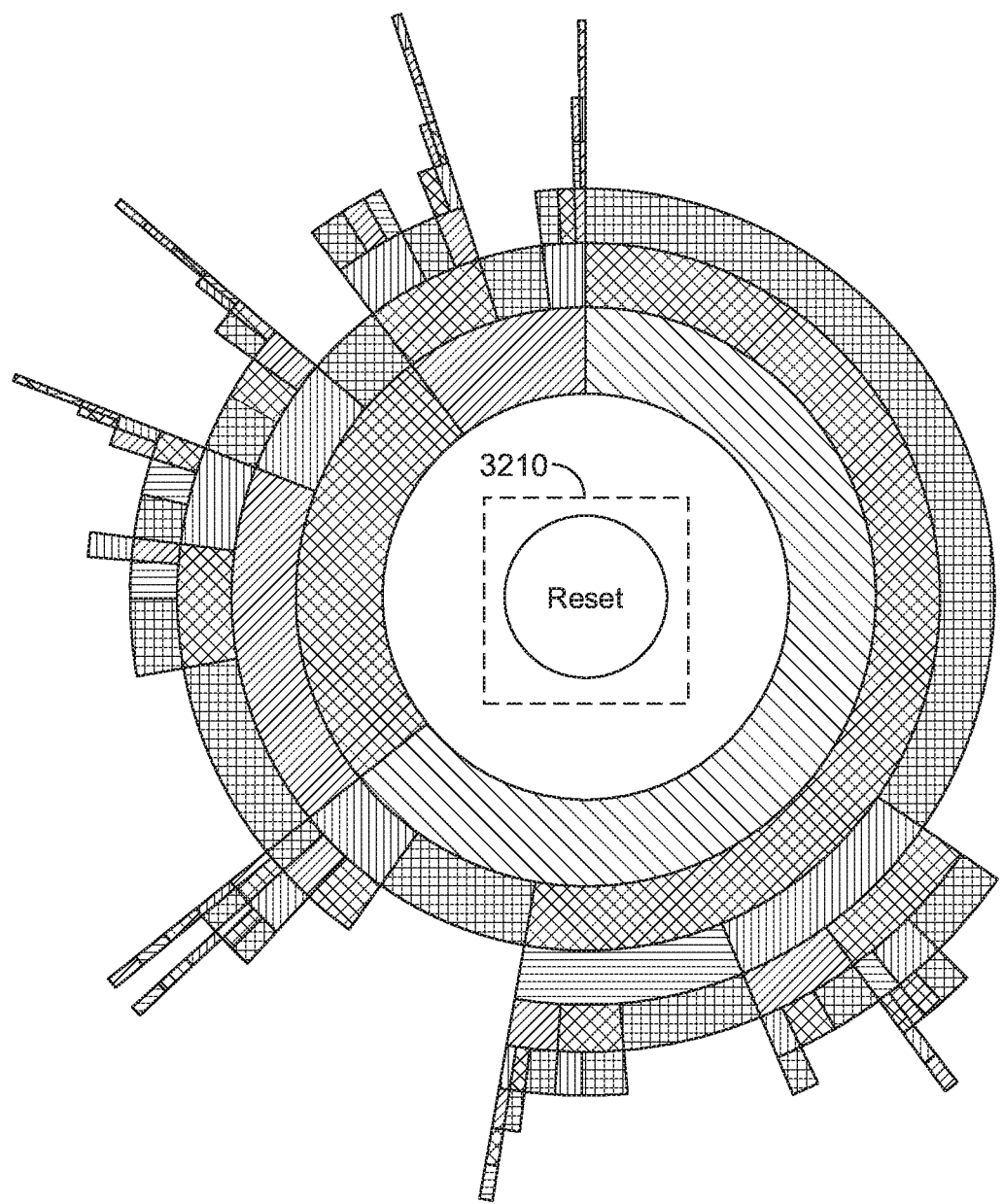
Figure 34:
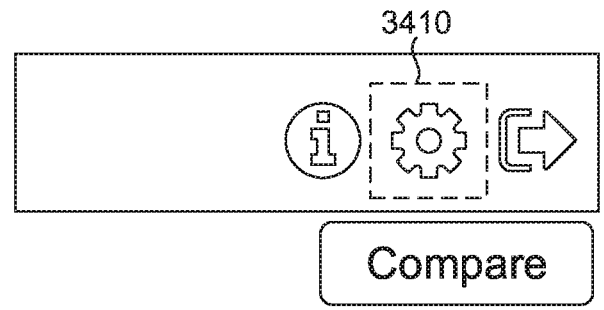
Figure 35:
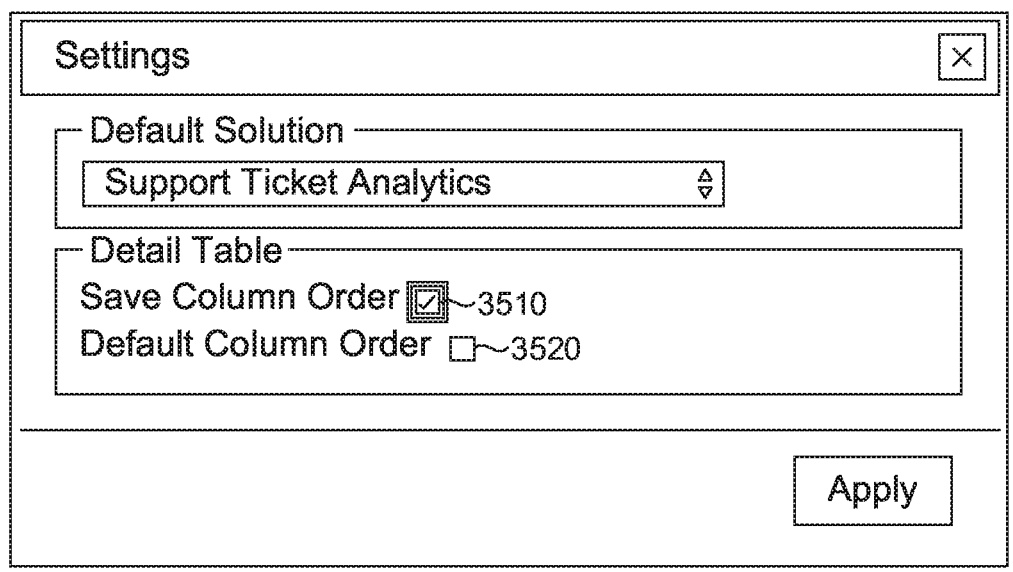

Referring next to FIGS. 30-32, features of sunburst charts provided by embodiments of the reusable analytics system are illustrated. After an arc 3010 within the sunburst chart is selected, the reusable analytics system filters the data down to a specific process path corresponding to the selected arc 3010 in both the sunburst chart 3110 and a detail data table (not shown). A reset button 3210 clears any drill down performed on a process path.

FIGS. 33-38 illustrate features of the detail data table provided by the reusable analytics system. Columns 3310 may be reordered by dragging and dropping a column header to a desired location in the detail table. After the columns 3310 are reordered, the column reorder can be saved by navigating to the settings dialog (found by clicking on the gear icon 3410). Selecting the save column order box 3510 and applying the changes in the settings dialog enables the user to save the column reorder. Additionally, the default column order can be restored by selecting the default column order box 3520 and applying the changes.

In embodiments, additional drill level to display lower level detailed information can be provided by selecting the + button 3610. Upon selecting the + button 3610, additional details populate directly below the row. Continuing the revenue cycle example, the lower level details may include the hold status and hold reason changes 3710 of a claim. A specific record may be searched for within the detail data table by searching for a universal identification in the filter by universal identification search bar 3810. The search filters only within the current table's data while the universal identification search bar 3810 queries for a specific record from the database.

Figure 39:
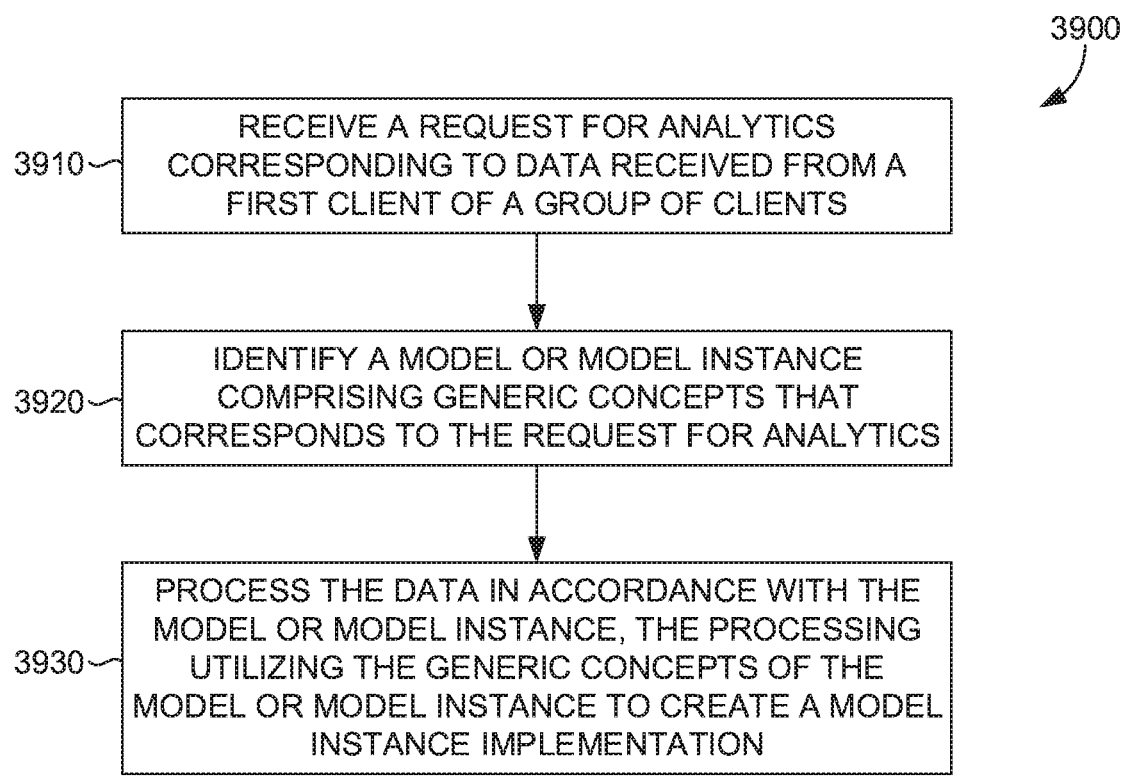
FIG. 39 is a flow diagram showing an exemplary method for providing reusable analytics, in accordance with various embodiments of the present invention.

Turning now to FIG. 39, a flow diagram is provided illustrating a method 3900 for providing reusable analytics, in accordance with an embodiment of the present invention. Method 3900 may be performed by any computing device (such as computing device described with respect to FIG. 1) with access to a reusable analytics system (such as the one described with respect to FIG. 2) or by one or more components of the reusable analytics system.

Initially, as shown at step 3910, a request for analytics corresponding to data received from a first client of a group of clients is received. In embodiments, the reference data may originate from disparate sources and may be merged into a single record.

At step 3920, a model or model instance comprising generic concepts that corresponds to the request for analytics is identified.

At step 3930, the data is processed in accordance with the model or model instance. The processing utilizes the generic concepts of the model or model instance to create a model instance implementation. The processing may include removing client-specific words and phrases from the data that do not impact the model. Additionally or alternatively, processing the data may include modifying client-specific words and phrases of the data to provide additional insights to the model. Source specific values and client specific values of the data may be mapped to a standardized nomenclature.

In some embodiments concurrent duplicate steps corresponding to the data are removed and combined into a single step. Automated steps corresponding to the data may be identified. Gaps corresponding to the data may be identified and new steps may be created to account for the gaps. The new steps may be made available for processing by the model or model instance. A single primary step path corresponding to the data may be identified. Test data corresponding to the data may be identified and removed from processing by the model or model instance.

In some embodiments, the first client may also be enabled to add custom logic to the model instance implementation. For example, the custom logic may include client-specific display labels. The custom logic may also include custom analytic concepts. The custom logic may further include client field level logic. The custom logic may also include natural language processing logic. The custom logic may further include time range selection for display of the data by the model instance.

In some embodiments, other clients of the group of clients are enabled to submit requests for analytics that reuse generic concepts of the model instance implementation to create other model instance implementations.

Figure 40:
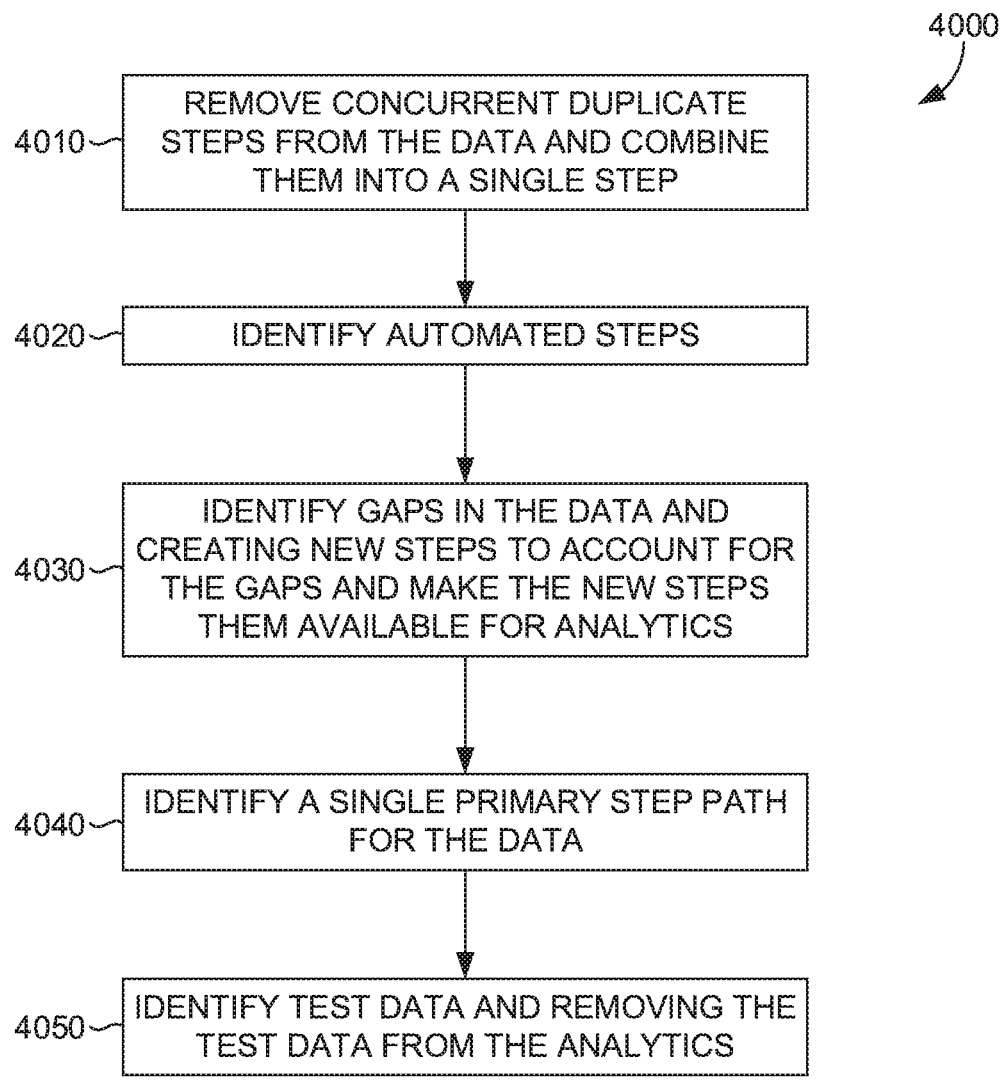
FIG. 40 is a flow diagram showing an exemplary method for cleaning data for reusable analytics, in accordance with various embodiments of the present invention.

Referring now to FIG. 40, a flow diagram is provided illustrating a method 4000 for cleaning data for reusable analytics, in accordance with an embodiment of the present invention. Method 4000 may be performed by any computing device (such as computing device described with respect to FIG. 1) with access to a reusable analytics system (such as the one described with respect to FIG. 2) or by one or more components of the reusable analytics system.

Initially, as shown at step 4010, concurrent duplicate steps are removed from the data and combined into a single step.

At step 4020, automated steps are identified.

At step 4030, gaps in the data are identified and new steps are created to account for the gaps. The new steps are additionally made available for analytics.

At step 4040, a single primary step path is identified for the data.

At step 4050, test data is identified and removed from the analytics.

Figure 41:
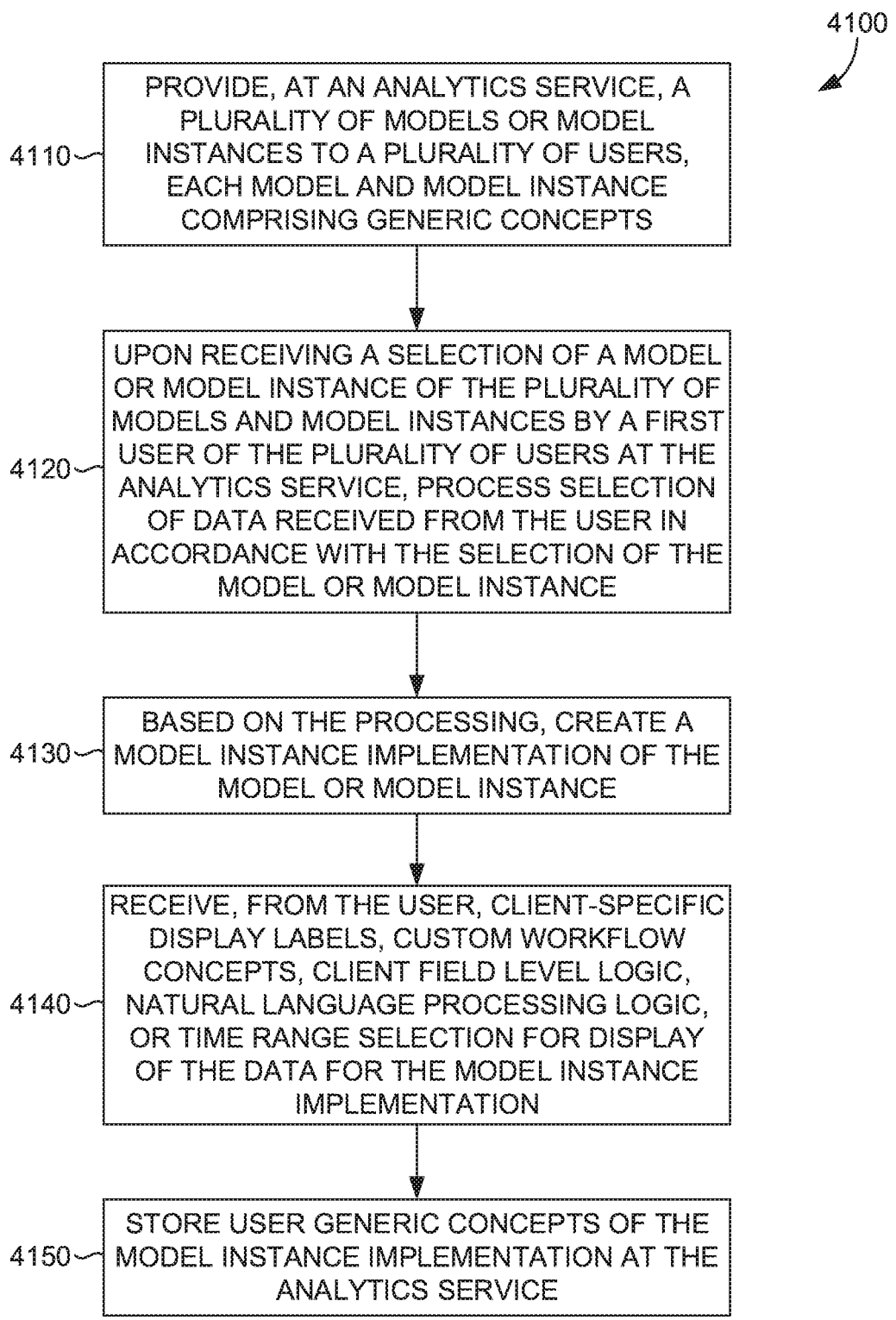
FIG. 41 is a flow diagram showing an exemplary method providing reusable analytics, in accordance with various embodiments of the present invention.

Referring now to FIG. 41, a flow diagram is provided illustrating a method 4100 for providing reusable analytics, in accordance with an embodiment of the present invention.

Method 4100 may be performed by any computing device (such as computing device described with respect to FIG. 1) with access to a reusable analytics system (such as the one described with respect to FIG. 2) or by one or more components of the reusable analytics system.

Initially, as shown at step 4110, a plurality of models and model instances is provided, at an analytics service, to a plurality of users. Each model and model instance comprises generic concepts.

At step 4120, upon receiving a selection of a model or model instance by a first user of the plurality of users at the analytics service, a selection of data received from the user is processed in accordance with the selection of the model or model instance. In embodiments, the data includes reference data and activity data. The reference data may originate from disparate sources and can be merged into a single record.

In some embodiments, processing the data comprises removing client-specific words and phrases from the data that do not impact the model or modifying client-specific words and phrases of the data to provide additional insights to the model. In some embodiments, source specific values and client specific values of the data are mapped to a standardized nomenclature.

At step 4130, based on the processing, a model instance implementation of the model or model instance is created.

At step 4140, client-specific display labels, custom concepts, client field level logic, natural language processing logic, or time range selection for display of the data are received from the user to further customize the model instance implementation.

At step 4150, generic concepts of the model instance implementation are stored at the analytics service. In some embodiments, a request from another user of the plurality of users may be received to access the generic concepts of the model instance implementation. If the other user is authorized to access the generic concepts of the model instance implementation, the other user is enabled to utilize the user generic concepts of the model instance implementation.

As can be understood, the present invention provides systems, methods, and user interfaces for providing reusable analytics. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. One or more non-transitory computer storage media having computer-executable instructions embodied thereon, that when executed, perform operations for creating an analytic model instance implementation, the operations comprising:
   receiving a request for analytics corresponding to data received from a first client of a group of clients;
   identifying a model comprising generic concepts, the model corresponding to the request for analytics;
   mapping source specific values and client-specific values of the data received to a standardized nomenclature recognizable by a processing component, the mapping based at least in part on a time sequence;
   in response to the mapping, cleansing the data received by removing duplicate steps that are concurrent in time to their duplicates based on the time sequence;
   customizing, via the processing component, client-specific words corresponding to the data received to provide additional insight;
   subsequent to the cleansing and the customizing, creating the analytic model instance implementation by processing, via the processing component, the data received that was cleansed and the customized client-specific words in accordance with the model that was identified.

2. The media of claim 1, further comprising creating a new model utilizing the generic concepts from other models, the new model comprising the generic concepts that correspond to the request for analytics.

3. The media of claim 2, further comprising creating a new model instance based on an existing model, the new model instance comprising the generic concepts that correspond to the request for analytics.

4. The media of claim 1, further comprising enabling other clients of the group of clients to submit requests for analytics that reuse the generic concepts of the analytic model instance implementation.

5. The media of claim 1, further comprising:
   enabling the first client to customize the client-specific words via a display label, a client field level logic, and a time range selection for displaying the data received; and
   processing the customized client-specific words in accordance with the analytic model instance implementation.

6. The media of claim 5, wherein customizing the client-specific words comprising adding client-specific display labels.

7. The media of claim 5, wherein customizing the client-specific words comprises adding a time range selection for display of the data received.

8. The media of claim 5, wherein the client-specific words are customized using natural language processing.

9. The media of claim 5, wherein the generic concepts include data structures, data processing, data cleaning, data mapping, analytic concepts, analytic widgets, logic, and graphical components.

10. The media of claim 5, further comprising displaying data processed by the analytic model instance implementation and exporting the data that was processed.

11. The media of claim 1, wherein the data received includes reference data and activity data, the reference data originating from at least two disparate sources, wherein the media further comprises merging the reference data from the at least two disparate sources into a single record.

12. The media of claim 1, further comprising:
   determining a step of the model is less than a predefined amount of time;
   flagging the step as an automated step; and
   excluding the automated step during the processing of the data received that was cleansed and the customized client-specific words in accordance with the model that was identified.

13. The media of claim 1, wherein processing the data comprises sorting the data received in the time sequence and identifying gaps within a workflow.

14. The media of claim 1, wherein the analytic model instance implementation is a workflow analytics model comprising a support tickets workflow, and wherein the operations further comprise:

providing for display word cloud options for filtering the client-specific words that were customized;

receiving a selection of a particular word and a number of combinations of the particular word; and providing for display a word cloud in response to receiving the selection of the particular word and the number of combinations.

15. A computerized method for creating an analytic model instance implementation, the method comprising:

providing, at an analytics service, a plurality of models to a plurality of users, each model comprising generic concepts;

upon receiving a selection of a model of the plurality of models by a user of the plurality of users at the analytics service, processing a selection of data received from the user in accordance with the selection of the model by mapping source specific values and client-specific values of the data received to a standardized nomenclature;

removing client-specific words from the data received; and in response to the removing and based on the processing, creating the analytic model instance implementation by processing the standardized nomenclature and the data without the client-specific words in accordance with the model that was selected, the analytic model instance implementation having the generic concepts of the model selected.

16. The method of claim 15, further comprising receiving a request from another user of the plurality of users to utilize the generic concepts of the analytic model instance implementation.

17. The method of claim 16, further comprising determining if the other user is authorized to utilize the generic concepts of the analytic model instance implementation.

18. The method of claim 17, further comprising, upon determining the other user is authorized to utilize the generic concepts of the analytic model instance implementation, enabling the other user to utilize the generic concepts of the analytic model instance implementation.

19. A computerized system comprising:

one or more processors; and a non-transitory computer storage media storing computer-useable instructions that, when used by the one or more processors, cause the one or more processors to:

provide, at an analytics service, a plurality of models to a plurality of users, each model comprising generic concepts;

upon receiving a selection of a model of the plurality of models by a user of the plurality of users at the analytics service, process a selection of data received from the user in accordance with the selection of the model by mapping source specific values and client-specific values of the data received to a standardized nomenclature; and provide an analytics interface to the user corresponding to the selection of the data received and the model, the analytics interface providing an analytic model instance implementation based on the selection of the data received and mapping the source specific values and the client-specific values to a standardized nomenclature, the analytic model instance implementation comprising first user generic concepts accessible via the analytics interface and available for reuse by other authorized users.

20. The system of claim 19 further comprising:

receiving, from the user, client-specific display labels, custom concepts, client field level logic, natural language processing logic, and time range selection for the data received; and customizing the analytic model instance implementation using the client-specific display labels, the custom concepts, the client field level logic, the natural language processing logic, and the time range selection.

* * * * *

UNITED STATES PATENT AND TRADEMARK OFFICE
CERTIFICATE OF CORRECTION

PATENT NO. : 11,119,762 B1  
APPLICATION NO. : 16/050609  
DATED : September 14, 2021  
INVENTOR(S) : Aaron Matthew Bush, Jeffrey Andrew Townsend and Daniel Lee Martin Page 1 of 1

It is certified that error appears in the above-identified patent and that said Letters Patent is hereby corrected as shown below:

On the Title Page

Column 2, Line 4 Item (56): Delete "Kains" and insert -- Kalns --, therefor.
Column 2, Line 5 Item (56): Delete "Kains" and insert -- Kalns --, therefor.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*